(12) United States Patent
Takahashi et al.

(10) Patent No.: US 11,651,582 B2
(45) Date of Patent: May 16, 2023

(54) INDIVIDUAL IDENTIFICATION SYSTEM

(71) Applicant: NEC Corporation, Tokyo (JP)

(72) Inventors: Toru Takahashi, Tokyo (JP); Yuta Kudo, Tokyo (JP); Kengo Makino, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 17/278,470

(22) PCT Filed: Sep. 26, 2018

(86) PCT No.: PCT/JP2018/035810
§ 371 (c)(1),
(2) Date: Mar. 22, 2021

(87) PCT Pub. No.: WO2020/065798
PCT Pub. Date: Apr. 2, 2020

(65) Prior Publication Data
US 2022/0044059 A1    Feb. 10, 2022

(51) Int. Cl.
*G06T 7/40* (2017.01)
*G06V 10/75* (2022.01)
(Continued)

(52) U.S. Cl.
CPC ......... *G06V 10/751* (2022.01); *G06K 9/6215* (2013.01); *G06T 7/337* (2017.01);
(Continued)

(58) Field of Classification Search
CPC .... G06V 10/751; G06V 10/40; G06V 10/431; G06V 2201/06; G06V 20/80;
(Continued)

(56) References Cited

U.S. PATENT DOCUMENTS

2001/0033685 A1   10/2001 Ishiyama
2014/0140570 A1*  5/2014 Ross ............... G06V 10/56
                                               382/100
(Continued)

FOREIGN PATENT DOCUMENTS

JP    2001-283216 A    10/2001
JP    2013-064625 A     4/2013
(Continued)

OTHER PUBLICATIONS

International Search Report for PCT Application No. PCT/JP2018/035810, dated Dec. 4, 2018.

*Primary Examiner* — Matthew C Bella
*Assistant Examiner* — Kathleen M Broughton

(57) ABSTRACT

An individual identification system includes: a storing unit for storing an image capture parameter in association with data characterizing a surface of a reference object; an acquiring unit that, when data characterizing a surface of an object to be matched is input, calculates an approximation degree between the input data and each data stored in the storing unit, and acquires the image capture parameter applied to the object to be matched from the storing unit based on the calculated approximation degree; a condition setting unit that sets an image capture condition determined by the acquired image capture parameter; an image capturing unit that acquires an image of the surface of the object to be matched under the set image capture condition; an extracting unit that extracts a feature value from the acquired image; and a matching unit that matches the extracted feature value against a registered feature value.

13 Claims, 33 Drawing Sheets

(51) Int. Cl.
  *G06T 7/80*     (2017.01)
  *G06T 7/33*     (2017.01)
  *G06V 10/40*    (2022.01)
  *G06K 9/62*     (2022.01)

(52) U.S. Cl.
  CPC ............... *G06T 7/40* (2013.01); *G06T 7/80* (2017.01); *G06V 10/40* (2022.01)

(58) Field of Classification Search
  CPC .... G06K 9/6215; G06K 9/623; G06K 9/6231; G06T 7/337; G06T 7/40; G06T 7/80; G01N 21/27
  See application file for complete search history.

(56) References Cited

U.S. PATENT DOCUMENTS

| | | | |
|---|---|---|---|
| 2015/0192838 A1 | 7/2015 | Ishiyama | |
| 2017/0344823 A1* | 11/2017 | Withrow | ................. G06F 21/30 |
| 2018/0144211 A1* | 5/2018 | Ross | ................... G06V 10/245 |

FOREIGN PATENT DOCUMENTS

| | | | |
|---|---|---|---|
| JP | 2015-008374 A | | 1/2015 |
| JP | 2015-173344 A | | 10/2015 |
| JP | 2015173344 A | * | 10/2015 |
| WO | 2014/021449 A1 | | 2/2014 |

* cited by examiner

FIG. 1
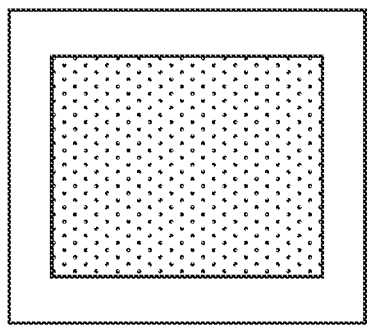
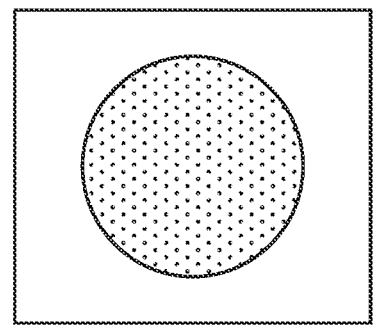
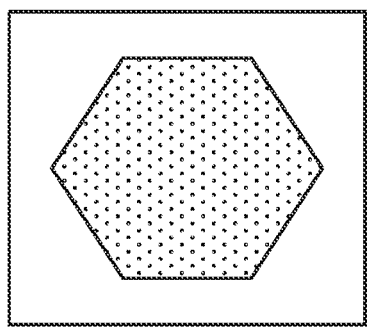
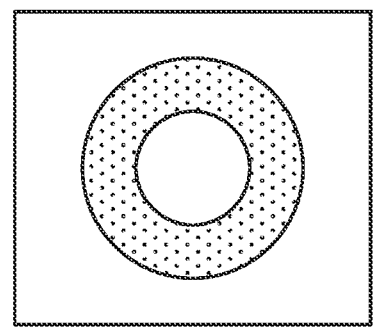

FIG. 7

| GROUP NUMBER | MATERIAL | SURFACE ROUGHNESS(Ra) | SHAPE |
|---|---|---|---|
| 1 | METAL | 0.2 μm | DONUT SHAPE |
| 2 | METAL | 1.0 μm | FLAT |
| 3 | RESIN | 0.45 μm | CIRCLE |
| ... | ... | ... | ... |

FIG. 10

| GROUP NUMBER | DATA CHARACTERIZING OBJECT SURFACE | | | PARAMETER | | | |
|---|---|---|---|---|---|---|---|
| | | | | IMAGE CAPTURE PARAMETER | | IMAGE PROCESSING PARAMETER | |
| | MATERIAL | SURFACE ROUGHNESS | SHAPE | ILLUMINATION ANGLE | IMAGE RESOLUTION | PREPROCESSING PARAMETER SET | IMAGE PROCESSING PARAMETER SET |
| 1 | METAL | 0.2 μm | DONUT SHAPE | — | — | — | — |
| ... | ... | ... | ... | ... | ... | ... | ... |

FIG. 11

| CANDIDATE | ILLUMINATION ANGLE | IMAGE RESOLUTION | PREPROCESSING PARAMETER SET | FEATURE EXTRACTION PARAMETER SET |
|---|---|---|---|---|
| a1 | θ1 | m1 | pr1 | eq1 |
| a2 | θ1 | m1 | pr1 | eq2 |
| a3 | θ1 | m1 | pr1 | eq3 |
| ... | ... | ... | ... | ... |
| an | θa | mb | prc | eqd |

FIG. 12

| CANDIDATE | POSTURE |
|---|---|
| b1 | POSTURE p1 |
| ⋮ | ⋮ |
| bm | POSTURE pm |

FIG. 13

| A | SAMPLE ID | B=b1 | B=b2 | ... | B=bm |
|---|---|---|---|---|---|
| a1 | 001 | IMAGE G111 | IMAGE G112 | ... | IMAGE G11m |
| | 002 | IMAGE G211 | IMAGE G212 | ... | IMAGE G21m |
| | .. | .. | .. | ... | .. |
| | N | IMAGE GN11 | IMAGE GN12 | ... | IMAGE GN1m |
| a2 | 001 | IMAGE G121 | IMAGE G122 | ... | IMAGE G12m |
| | 002 | IMAGE G221 | IMAGE G222 | ... | IMAGE G22m |
| | .. | .. | .. | ... | .. |
| | N | IMAGE GN21 | IMAGE GN22 | ... | IMAGE GN2m |
| ... | ... | ... | ... | ... | ... |
| an | 001 | IMAGE G1n1 | IMAGE G1n2 | ... | IMAGE G1nm |
| | 002 | IMAGE G2n1 | IMAGE G2n2 | ... | IMAGE G2nm |
| | .. | .. | .. | ... | .. |
| | N | IMAGE GNn1 | IMAGE GNn2 | ... | IMAGE GNnm |

FIG. 14

| A | SAMPLE ID | B=b1 | B=b2 | ... | B=bm |
|---|---|---|---|---|---|
| a1 | 001 | FEATURE VALUE V111 | FEATURE VALUE V111 | ... | FEATURE VALUE V11m |
| | 002 | FEATURE VALUE V211 | FEATURE VALUE V212 | ... | FEATURE VALUE V21m |
| | ... | ... | ... | ... | ... |
| | N | FEATURE VALUE VN11 | FEATURE VALUE VN12 | ... | FEATURE VALUE VN1m |
| a2 | 001 | FEATURE VALUE V121 | FEATURE VALUE V122 | ... | FEATURE VALUE V12m |
| | 002 | FEATURE VALUE V221 | FEATURE VALUE V222 | ... | FEATURE VALUE V22m |
| | ... | ... | ... | ... | ... |
| | N | FEATURE VALUE VN21 | FEATURE VALUE VN22 | ... | FEATURE VALUE VN2m |
| ... | ... | ... | ... | ... | ... |
| an | 001 | FEATURE VALUE V1n1 | FEATURE VALUE V1n2 | ... | FEATURE VALUE V1nm |
| | 002 | FEATURE VALUE V2n1 | FEATURE VALUE V2n2 | ... | FEATURE VALUE V2nm |
| | ... | ... | ... | ... | ... |
| | N | FEATURE VALUE VNn1 | FEATURE VALUE VNn2 | ... | FEATURE VALUE VNnm |

FIG. 15

| A | FIRST FEATURE VALUE PAIR |
|---|---|
| a1 | COMBINATION OF SELECTING TWO FROM m FEATURE VALUES (V111, V112, ···, V11m) |
| | COMBINATION OF SELECTING TWO FROM m FEATURE VALUES (V211, V212, ···, V21m) |
| | ··· |
| | COMBINATION OF SELECTING TWO FROM m FEATURE VALUES (VN11, VN12, ···, VN1m) |
| a2 | COMBINATION OF SELECTING TWO FROM m FEATURE VALUES (V121, V122, ···, V12m) |
| | COMBINATION OF SELECTING TWO FROM m FEATURE VALUES (V221, V222, ···, V22m) |
| | ··· |
| | COMBINATION OF SELECTING TWO FROM m FEATURE VALUES (VN21, VN22, ···, VN2m) |
| ··· | ··· |
| an | COMBINATION OF SELECTING TWO FROM m FEATURE VALUES (V1n1, V1n2, ···, V1nm) |
| | COMBINATION OF SELECTING TWO FROM m FEATURE VALUES (V2n1, V2n2, ···, V2nm) |
| | ··· |
| | COMBINATION OF SELECTING TWO FROM m FEATURE VALUES (VNn1, VNn2, ···, VNnm) |

FIG. 16

| A | SECOND FEATURE VALUE PAIR |
|---|---|
| a1 | COMBINATION OF FEATURE VALUE V11x (x=1, 2, ..., m) AND FEATURE VALUE Viyy (i≠1, y IS ANY VALUE) |
|  | COMBINATION OF FEATURE VALUE V21x (x=1, 2, ..., m) AND FEATURE VALUE Viyy (i≠2, y IS ANY VALUE) |
|  | ... |
|  | COMBINATION OF FEATURE VALUE VN1x (x=1, 2, ..., m) AND FEATURE VALUE Viyy (i≠N, y IS ANY VALUE) |
| a2 | COMBINATION OF FEATURE VALUE V12x (x=1, 2, ..., m) AND FEATURE VALUE Viyy (i≠1, y IS ANY VALUE) |
|  | COMBINATION OF FEATURE VALUE V22x (x=1, 2, ..., m) AND FEATURE VALUE Viyy (i≠2, y IS ANY VALUE) |
|  | ... |
|  | COMBINATION OF FEATURE VALUE VN2x (x=1, 2, ..., m) AND FEATURE VALUE Viyy (i≠N, y IS ANY VALUE) |
| ... | ... |
| an | COMBINATION OF FEATURE VALUE V1nx (x=1, 2, ..., m) AND FEATURE VALUE Viyy (i≠1, y IS ANY VALUE) |
|  | COMBINATION OF FEATURE VALUE V2nx (x=1, 2, ..., m) AND FEATURE VALUE Viyy (i≠2, y IS ANY VALUE) |
|  | ... |
|  | COMBINATION OF FEATURE VALUE VNnx (x=1, 2, ..., m) AND FEATURE VALUE Viyy (i≠N, y IS ANY VALUE) |

FIG. 17

| A | DISTRIBUTION OF SCORES OF FIRST FEATURE VALUE PAIRS (FIRST DISTRIBUTION) | DISTRIBUTION OF SCORES OF SECOND FEATURE VALUE PAIRS (SECOND DISTRIBUTION) | SEPARATION DEGREE |
|---|---|---|---|
| a1 | DISTRIBUTION D11 | DISTRIBUTION D12 | SP1 |
| a2 | DISTRIBUTION D21 | DISTRIBUTION D22 | SP2 |
| ⋮ | ⋮ | ⋮ | ⋮ |
| an | DISTRIBUTION Dn1 | DISTRIBUTION Dn2 | SPn |

FIG. 24

| FEATURE VALUE | SUPPLEMENTARY INFORMATION |
|---|---|
| FEATURE VALUE PF1 | SUPPLEMENTARY INFORMATION SI1 |
| FEATURE VALUE PF2 | SUPPLEMENTARY INFORMATION SI2 |
| ⋮ | ⋮ |
| FEATURE VALUE PFn | SUPPLEMENTARY INFORMATION SIn |

| GROUP NUMBER | DATA CHARACTERIZING OBJECT SURFACE ||||||| PARAMETER ||||
|---|---|---|---|---|---|---|---|---|---|---|
| | MATERIAL INFORMATION || SURFACE ROUGHNESS INFORMATION || SHAPE INFORMATION || IMAGE CAPTURE PARAMETER || IMAGE PROCESSING PARAMETER ||
| | MATERIAL NAME | REFLECTANCE | PROCESSING NAME | SURFACE MEAN ROUGHNESS | SHAPE NAME | DIMENSIONS OF INNER DIAMETER AND OUTER DIAMETER | ILLUMINATION ANGLE | IMAGE RESOLUTION | PREPROCESSING PARAMETER SET | FEATURE EXTRACTION PARAMETER SET |
| 1 | ALUMINUM | 70% | MAT FINISH PROCESSING | 2 μm | RECTANGLE | INNER DIAMETER: 0mm OUTER DIAMETER: 15mm | P11 | P12 | P13 | P14 |
| 2 | RESIN | 30% | LATHE PROCESSING | 0.3 μm | CIRCLE | INNER DIAMETER: 0mm OUTER DIAMETER: 9mm | P21 | P22 | P23 | P24 |
| 3 | CHROME | 60% | SANDBLASTING | 1 μm | RING | INNER DIAMETER: 0.5mm OUTER DIAMETER: 10mm | P31 | P32 | P33 | P34 |
| ... | | | | | | | | | | |
| n | STANDARD VALUE | — | STANDARD VALUE | — | STANDARD VALUE | — | Pn1 | Pn2 | Pn3 | Pn4 |

INDIVIDUAL IDENTIFICATION SYSTEM

This application is a National Stage Entry of PCT/JP2018/035810 filed on Sep. 26, 2018, the contents of all of which are incorporated herein by reference, in their entirety.

TECHNICAL FIELD

The present invention relates to an individual identification system, an individual identification device, an individual registration device, an individual identification method, an individual registration method, and a recording medium.

BACKGROUND ART

An attempt has been made to extract a random pattern specific to an object from an image obtained by capturing the object and use an individual difference of the random pattern for authentication and matching.

For example, Patent Document 1 describes capturing an irregular pattern caused by a mat finish pattern formed on the surface of an object by using an imaging aid having an illumination angle for capturing the irregular pattern with a good contrast, and utilizing the pattern for object authentication and matching. Moreover, Patent Document 2 describes specifying an illumination angle of light suitable for an optical character of a given fine substance, optically reading a reference article in a state of being illuminated at the illumination angle to acquire reference image data, calculating reference feature value data from the reference image data, and storing it into a storage unit.
Patent Document 1: Japanese Translation of PCT International Application Publication WO2014/021449
Patent Document 2: Japanese Unexamined Patent Application Publication No. JP-A 2013-064625

In order to extract a random pattern specific to an object from an image obtained by capturing the object, it is necessary to take an image in which the random pattern specific to the object can be read with stability. For this, in Patent Document 1 and Patent Document 2, it is considered to store an illumination angle specified in advance as the value of an image capture parameter, set an image capture condition determined by the value of the image capture parameter, and capture an image of an object to be authenticated and matched under the image capture condition. However, in a case where there are many types of objects to be authenticated and matched, it is difficult in terms of time and cost to specify the value of an image capture parameter in advance for each of the types of the objects. Moreover, in the case of a new object such as a new product, originally, it is impossible to specify the value of an image capture parameter in advance. Therefore, there is a problem that an appropriate image capture condition cannot be set for an object for which the value of an image capture parameter is not specified in advance.

SUMMARY

An object of the present invention is to provide an individual identification system that solves the abovementioned problem.

An individual identification system according to an aspect of the present invention includes: a storing unit configured to have an image capture parameter stored therein in association with data characterizing a surface of a reference object; an acquiring unit configured to, when data characterizing a surface of an object to be matched is input, calculate an approximation degree between the input data and each data stored in the storing unit, and acquire the image capture parameter applied to the object to be matched from the storing unit based on the calculated approximation degree; a condition setting unit configured to set an image capture condition determined by the acquired image capture parameter; an image capturing unit configured to acquire an image of the surface of the object to be matched under the set image capture condition; an extracting unit configured to extract a feature value from the acquired image; and a matching unit configured to match the extracted feature value against a registered feature value.

An individual identification device according to another aspect of the present invention includes: an acquiring unit configured to, when data characterizing a surface of an object to be matched is input, calculate an approximation degree between each data stored in a storing unit configured to have an image capture parameter stored therein in association with data characterizing a surface of a reference object and the input data, and acquire the image capture parameter applied to the object to be matched from the storing unit based on the calculated approximation degree; a condition setting unit configured to set an image capture condition determined by the acquired image capture parameter; an image capturing unit configured to acquire an image of the surface of the object to be matched under the set image capture condition; an extracting unit configured to extract a feature value from the acquired image; and a matching unit configured to match the extracted feature value against a registered feature value.

An individual registration device according to another aspect of the present invention includes: an acquiring unit configured to, when data characterizing a surface of an object to be registered is input, calculate an approximation degree between each data stored in a storing unit configured to have an image capture parameter stored therein in association with data characterizing a surface of a reference object and the input data, and acquire the image capture parameter applied to the object to be registered from the storing unit based on the calculated approximation degree; a condition setting unit configured to set an image capture condition determined by the acquired image capture parameter; an image capturing unit configured to acquire an image of the surface of the object to be registered under the set image capture condition; an extracting unit configured to extract a feature value from the acquired image; and a registering unit configured to register the extracted feature value as a registered feature value.

A recording medium according to another aspect of the present invention is a non-transitory computer-readable recording medium having a program recorded therein, and the program includes instructions to cause a computer to function as: an acquiring unit configured to, when data characterizing a surface of an object to be matched is input, calculate an approximation degree between each data stored in a storing unit configured to have an image capture parameter stored therein in association with data characterizing a surface of a reference object and the input data, and acquire the image capture parameter applied to the object to be matched from the storing unit based on the calculated approximation degree; a condition setting unit configured to set an image capture condition determined by the acquired image capture parameter; an image capturing unit configured to acquire an image of the surface of the object to be matched under the set image capture condition; an extracting unit configured to extract a feature value from the acquired image; and a matching unit configured to match the extracted feature value against a registered feature value.

An individual identification method according to another aspect of the present invention includes: when data characterizing a surface of an object to be matched is input, calculating an approximation degree between each data stored in a storing unit configured to have an image capture parameter stored therein in association with data characterizing a surface of a reference object and the input data, and acquiring the image capture parameter applied to the object to be matched from the storing unit based on the calculated approximation degree; setting an image capture condition determined by the acquired image capture parameter; acquiring an image of the surface of the object to be matched under the set image capture condition; extracting a feature value from the acquired image; and matching the extracted feature value against a registered feature value.

An individual registration method according to another aspect of the present invention includes: when data characterizing a surface of an object to be registered is input, calculating an approximation degree between each data stored in a storing unit configured to have an image capture parameter stored therein in association with data characterizing a surface of a reference object and the input data, and acquiring the image capture parameter applied to the object to be registered from the storing unit based on the calculated approximation degree; setting an image capture condition determined by the acquired image capture parameter; acquiring an image of the surface of the object to be registered under the set image capture condition; extracting a feature value from the acquired image; and registering the extracted feature value as a registered feature value.

With the configurations as described above, the present invention makes it possible to set an image capture condition for an object for which the value of an image capture parameter is not specified in advance but which is an object having a very similar surface to the surface of an object for which the value of an image capture parameter is specified in advance.

BRIEF DESCRIPTION OF DRAWINGS

FIG. 1 is a view showing an example of a shape characterizing the surface of an object in a first example embodiment of the present invention;

FIG. 7 is a view showing an example of a sample object group in the first example embodiment of the present invention;

FIG. 10 is a view showing an example of the content of a parameter storage unit in the individual identification device according to the first example embodiment of the present invention;

FIG. 11 is a view showing an example of candidates of the value of a parameter set A in the individual identification device according to the first example embodiment of the present invention;

FIG. 12 is a view showing an example of candidates of the value of a parameter set B in the individual identification device according to the first example embodiment of the present invention;

FIG. 13 is a view showing an example of the content of an image storage unit in the individual identification device according to the first example embodiment of the present invention;

FIG. 14 is a view showing an example of the content of a feature value storage unit in the individual identification device according to the first example embodiment of the present invention;

FIG. 15 is a view showing an example of the content of a first feature value pair storage unit in the individual identification device according to the first example embodiment of the present invention;

FIG. 16 is a view showing an example of the content of a second feature value pair storage unit in the individual identification device according to the first example embodiment of the present invention;

FIG. 17 is a view showing an example of the content of a distribution storage unit in the individual identification device according to the first example embodiment of the present invention;

FIG. 24 is a view showing an example of the content of individual registration information stored in a feature value storage unit in the individual identification device according to the first example embodiment of the present invention;

FIG. 28 is a view showing an example of the content of a parameter storage unit of an individual identification device according to a third example embodiment of the present information;

EXAMPLE EMBODIMENTS

Figure 2:
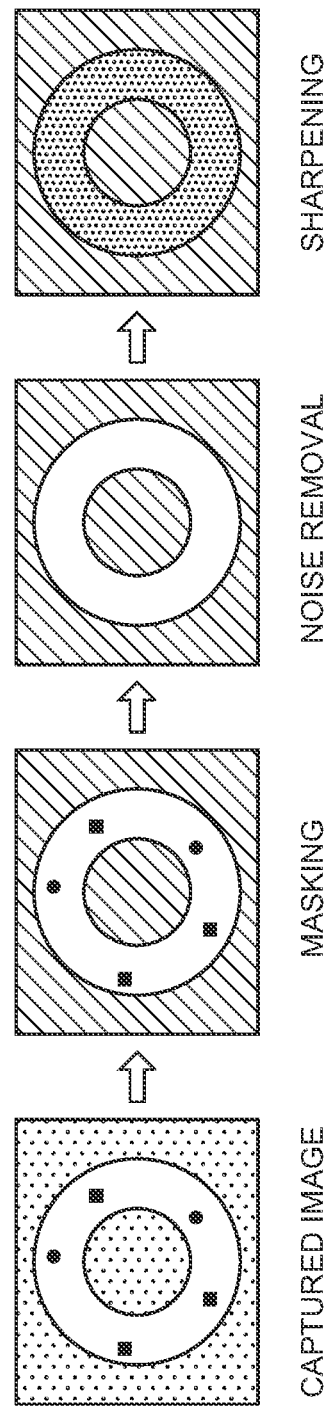
FIG. 2 is a view showing the overview of preprocessing performed on an image of an object to be subject to individual identification in the first example embodiment of the present invention.

Next, example embodiments of the present invention will be described in detail with reference to the drawings.

FIRST EXAMPLE EMBODIMENT

In a configuration in this example embodiment, the values of an image capture parameter and an image processing parameter are determined in advance for each reference object, and the determined values are associated with the value of data characterizing the surface of the reference object and stored in a storage device. Moreover, in a configuration in this example embodiment, at the time of individual identification, the values of the image capture parameter and the image processing parameter associated with the value of the data characterizing the surface of the reference object that approximates the value of data characterizing the surface of an object to be identified are acquired from the storage device. Moreover, in a configuration in this example embodiment, an image capture condition and an image processing condition that are determined by the acquired values of the image capture parameter and the image processing parameter are set, an image of the surface of the object to be subject to individual identification is acquired under the above image capture condition, image processing is performed under the above image processing condition to extract a feature value from the image, and match the extracted feature value against a registered feature value is performed.

First, data characterizing the surface of an object, an image capture parameter, and an image processing parameter will be described.

<Data Characterizing the Surface of an Object>

One example of data characterizing the surface of an object is data representing the material of an object surface. Resin, metal, ceramic, carbon fiber, glass, paper, wood, steel, and so on, are examples of the data representing the material.

Another example of data characterizing the surface of an object is data representing the roughness of an object surface. Arithmetic mean roughness (Ra) is an example of the data representing the roughness of the surface of an object surface.

Still another example of data characterizing the surface of an object is the shape of an object (an individual identification target) in a captured image. Some examples of the shape are shown in FIG. 1. An outer rectangle is the captured image, and a hatched portion inside the outer rectangle is the shape of an object. FIG. 1 shows a plane (a rectangle), a polygon, a circle, and a ring (a donut shape) as examples of the shape, but the shape may be another one. It can be said that the shape is a two-dimensional shape of the face of a captured object. It can also be said that the shape is the shape of an image region of an object surface from which a feature value is extracted.

Data characterizing the surface of an object is not limited to the material, the roughness or the shape mentioned above. The reflectance, transmittance, optical character, and processing method such as mat processing or lathe processing of the surface of an object are other examples of data characterizing the surface of an object.

<Image Capture Parameter>

One example of an image capture parameter is an illumination angle. An illumination angle is an angle at which an illumination light enters the surface of an object.

Another example of an image capture parameter is an image resolution. An image resolution is represented by DPI (Dot Per Inch), for example. Since there is a certain causal relationship between an image resolution and an image capture magnification, an image capture magnification may be used as an image capture parameter instead of an image resolution.

An image capture parameter is not limited to the illumination angle or the image resolution mentioned above. The distance between an object and a camera, the intensity of an illumination light, the wavelength of an illumination light, the magnitude of an illumination light, and so on, are other examples of an image capture parameter.

<Image Processing Parameter>

An image processing parameter is broadly divided into a preprocessing parameter and a feature extraction parameter.

A preprocessing parameter is a parameter used in preprocessing executed before feature extraction on an image of an individual identification object. A feature extraction parameter is a parameter used in a feature extraction process executed on the image of the individual identification object after execution of preprocessing.

First, the overview of preprocessing will be described, and some parameters used in preprocessing will be described.

FIG. 2 is a view showing the overview of preprocessing performed on an image of an object to be subject to individual identification. In preprocessing, three processes of masking, noise removal and sharpening are executed in this order on a captured image.

In masking, the region of a captured image is divided into the region of an object to be subject to individual identification and the remaining region (background), and pixels belonging to the background are replaced with a specific pixel value. There are two methods for determining the specific pixel value. One method is replacement with a pixel value given in advance (in general, zero). The other method is to, for each of the pixels of the background to be replaced, determine a pixel value after the replacement based on the value of the pixel to be replaced and the values of the surrounding pixels. The range of the surrounding pixels is determined by a local image block given in advance. For example, in a case where a 3×3 block is used as the local image block, a pixel value after the replacement is determined by, for example, the mean value of nine pixels in total including the focused pixel and eight pixels around the pixel. The above specific pixel value such as zero and the above local image block are referred to as masking parameters. The masking parameter is an example of the preprocessing parameter.

In noise removal, noise that exists in the region of an object to be subject to individual identification in a captured image after masking is removed by a median filter, for example. Alternatively, the above noise is removed by a smoothing filter. Alternatively, noise (sensor noise) is removed by a bilateral filter. The median filter, the smoothing filter and the bilateral filter mentioned above are referred to as noise removal parameters. The noise removal parameter is another example of the preprocessing parameter.

In sharpening, a pattern having individual distinguishability is emphasized by optimizing the contrast of a captured image for each local region. For example, a captured image after noise removal is divided into local regions of image block sizes given in advance, and CLAHE (Contrast Limited Adaptive Histogram) is applied for each of the local regions. The image block size is referred to as a sharpening process parameter. The sharpening process parameter is still another example of the preprocessing parameter.

<Feature Extraction Parameter>

Next, the overview of a feature extraction process will be described, and some parameters used in the feature extraction process will be described.

Figure 3:
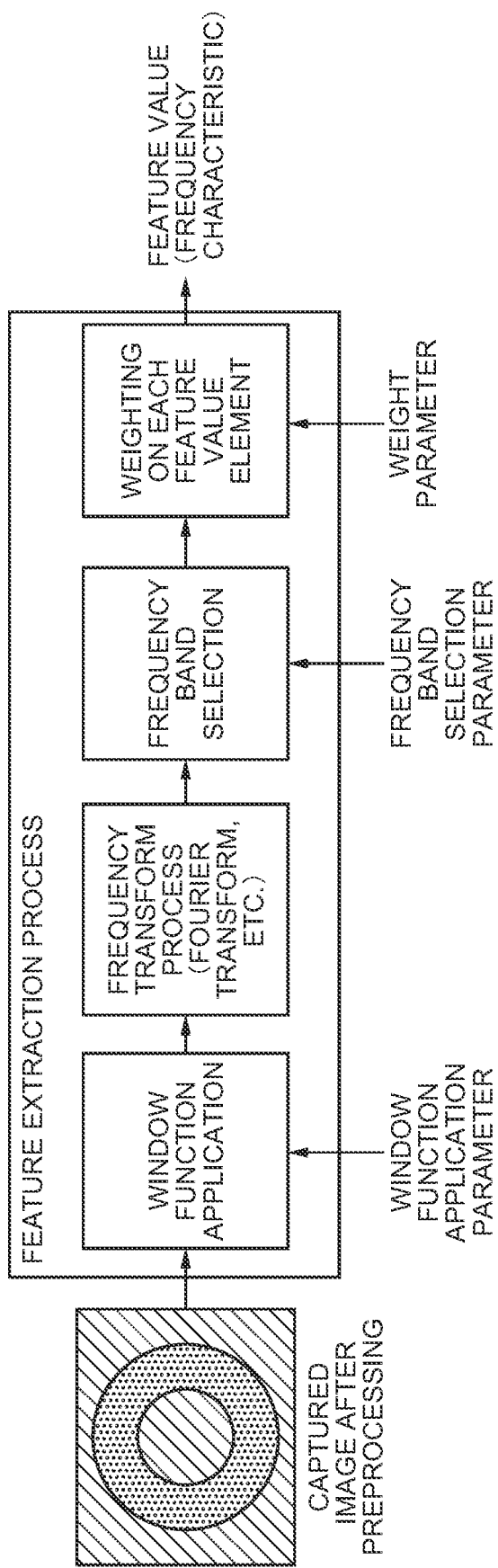
FIG. 3 is a view showing the overview of a feature extraction process in the first example embodiment of the present invention.

FIG. 3 is a view showing the overview of the feature extraction process. In the feature extraction process shown in FIG. 3, four processes including window function application, frequency transform process, frequency band selection, and weighting on each feature value element are executed in this order on a captured image after application of the preprocessing.

Window function application is executed for the purpose of suppressing noise mixing into a feature value caused by the discontinuity of image edges in frequency transformation in a subsequent stage. In the window function application, a window function (for example, a generalized humming window function) having a shape that can leave a pattern having individual distinguishability in a captured image as much as possible is used. A parameter that adjusts the shape of the window function is referred to as a window function application parameter. The window function application parameter is an example of the feature extraction parameter.

Frequency transform process is Fourier transform, for example.

In the frequency band selection, a frequency band element having individual distinguishability is selected from a two-dimensional data array (complex number), which is data after the frequency transform, in accordance with the size and center position coordinates of an array block given in advance. The size and center position coordinates of the array block mentioned above are referred to as frequency band selection parameters. The frequency band selection parameter is another example of the feature extraction parameter.

Weighting on each feature value element is performed by multiplying each frequency band element selected in the frequency band selection by, for example, a two-dimensional Gaussian function. A parameter that determines the shape in each of the two dimensions of the two-dimensional Gaussian function is referred to as a weight parameter for each feature value element. The weight parameter is still another example of the feature extraction parameter.

Subsequently, a configuration of an individual identification device according to this example embodiment will be described.

Figure 4:
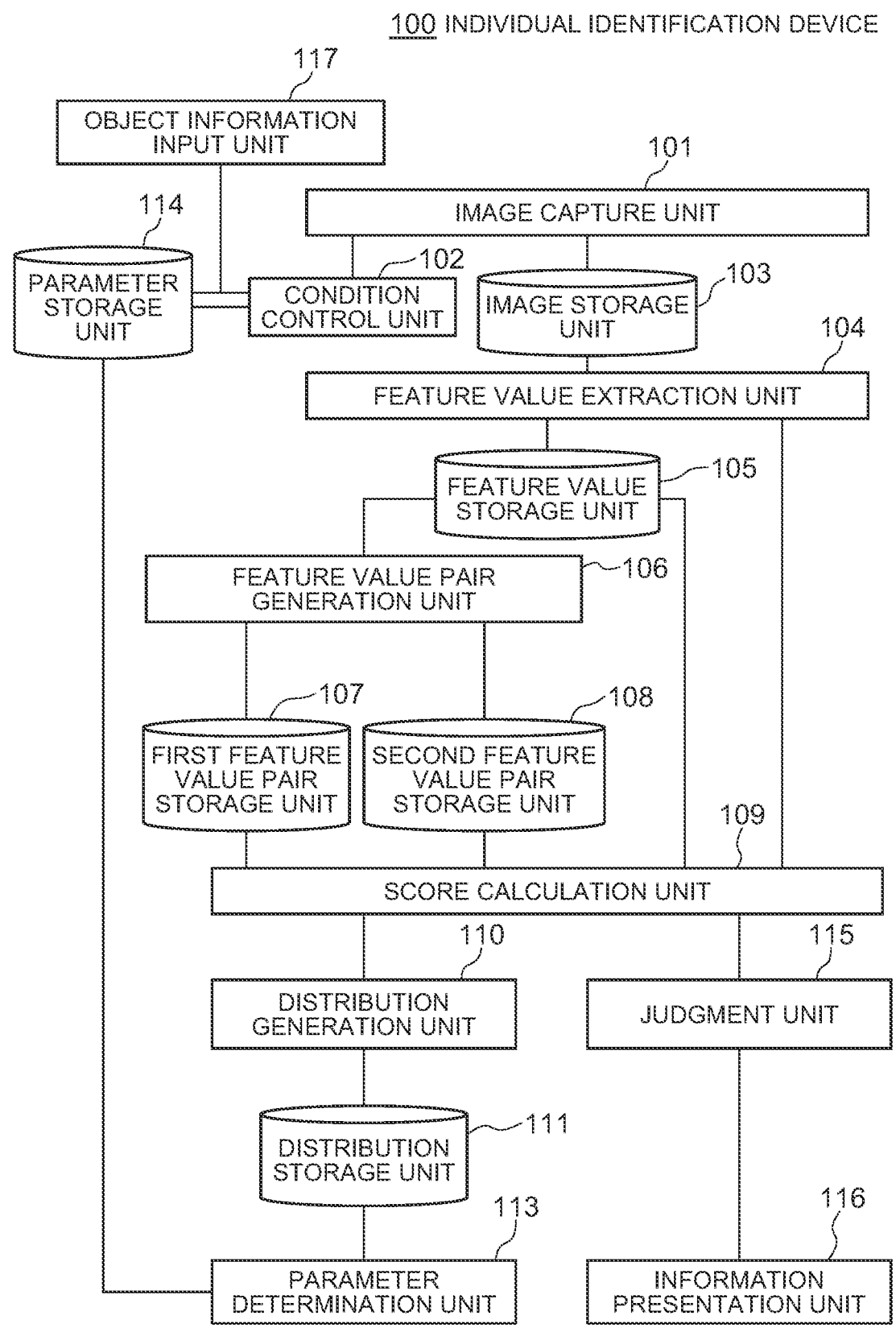
FIG. 4 is a block diagram of an individual identification device according to the first example embodiment of the present invention.

FIG. 4 is a block diagram of the individual identification device according to this example embodiment. An individual identification device 100 according to this example embodiment includes an image capture unit 101, a condition control unit 102, an image storage unit 103, a feature value extraction unit 104, a feature value storage unit 105, a feature value pair generation unit 106, a first feature value pair storage unit 107, a second feature value pair storage unit 108, a score calculation unit 109, a distribution generation unit 110, a distribution storage unit 111, a parameter determination unit 113, a parameter storage unit 114, a judgment unit 115, an information presentation unit 116, and an object information input unit 117.

The object information input unit 117 is configured to input the values of predetermined type of data that characterize the surfaces of a sample object (a reference object) and an object to be identified and matched. In this example embodiment, as the predetermined type of data, the above-mentioned three types of data including material, surface roughness, and shape are used. However, the type and number of the used data are not limited to the above.

The condition control unit 102 is configured to control an image capture condition of the image capture unit 101. The condition control unit 102 controls an image capture condition by combining the values of one or more types of predetermined image capture parameters. In this example embodiment, as the predetermined image capture parameters, three parameters including an illumination angle, an image resolution, and a relative posture of an object and a camera are used. Of these parameters, two parameters of an illumination angle and an image resolution are image capture parameters to be determined in advance. A relative posture of an object and a camera is not an image capture parameter to be determined in advance, but is used as a disturbance factor. The type and number of an image capture parameter to be determined in advance is not limited to the above. Likewise, the type and number of an image capture parameter to be used as a disturbance factor is not limited to the above.

Further, the condition control unit 102 is configured to control an image processing condition of the feature value extraction unit 104. The condition control unit 102 controls an image processing condition by combining the values of one or more types of predetermined image processing parameters. In this example embodiment, as the predetermined image processing parameters, two parameters of a preprocessing parameter set and a feature extraction parameter set are used. The preprocessing parameter set includes one or two or more parameters belonging to the abovementioned masking parameter, noise removal parameter, and sharpening process parameter. The feature extraction parameter set includes one or two or more parameters belonging to the abovementioned window function application parameter, frequency band selection parameter, and weight parameter.

The image capture unit 101 is configured to capture an image of an irregular pattern on the surface of an object to be managed by a camera based on an image capture condition set by the condition control unit 102. The irregular pattern on the surface of the object may be mat patterns formed on the surface of a product of the object, spontaneous fine irregularities or patterns caused in a manufacturing process, and the like.

Figure 5A:
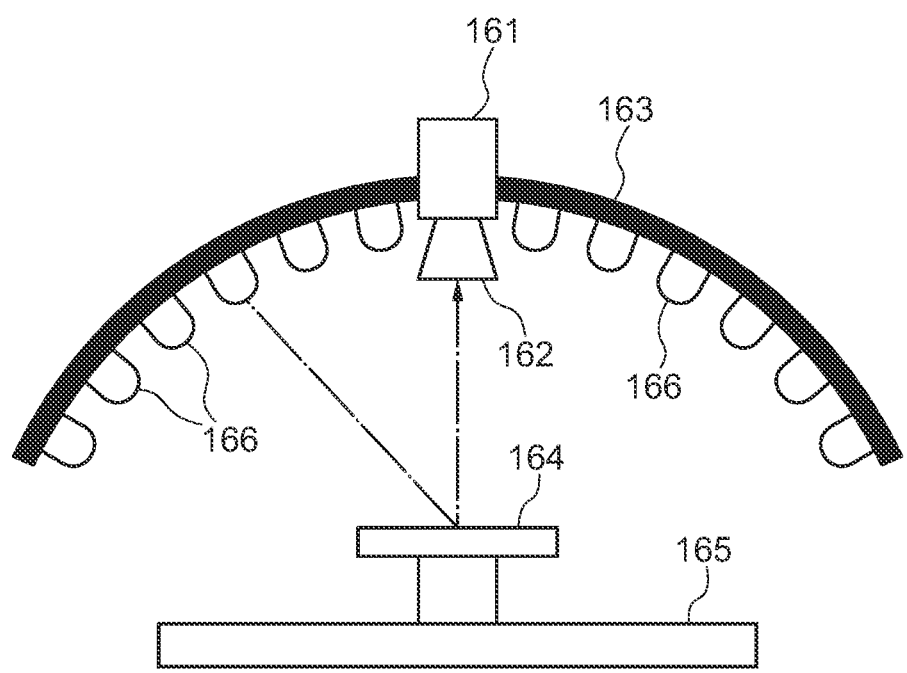
FIG. 5A is a cross-section view showing an example of a structure of an image capture unit of the individual identification device according to the first example embodiment of the present invention.
Figure 5B:
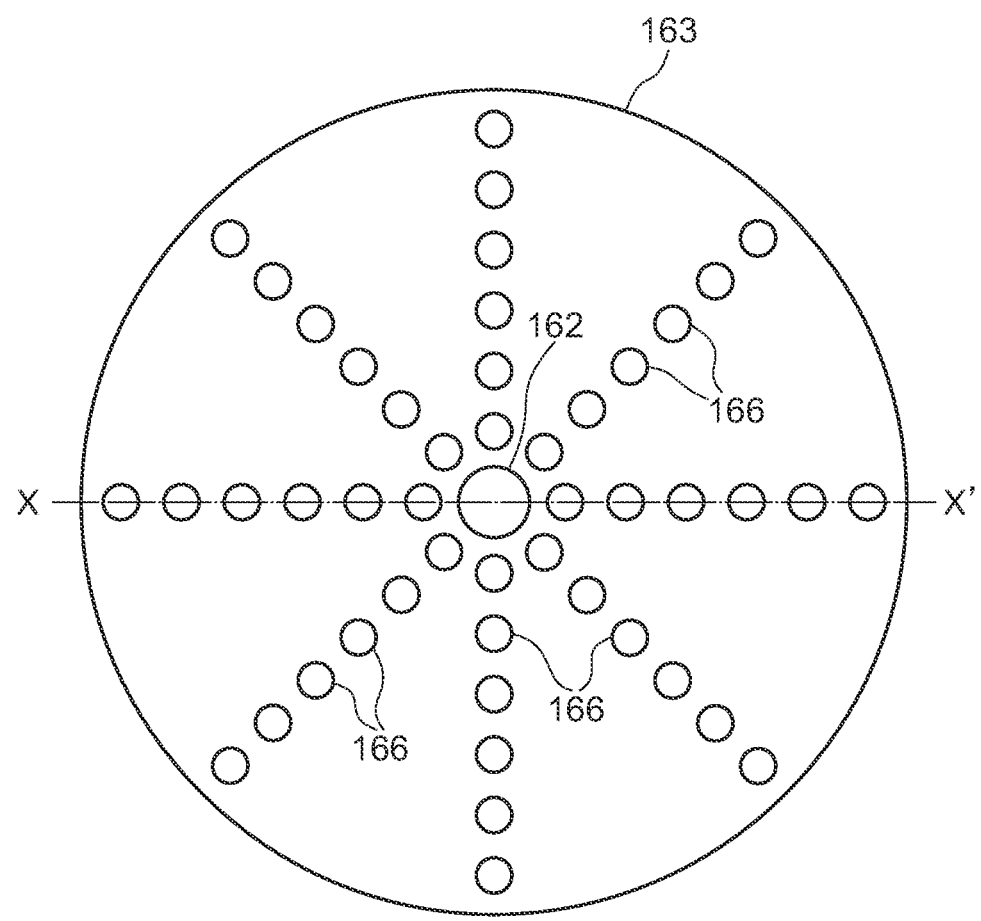
FIG. 5B is a top view showing the example of the structure of the image capture unit of the individual identification device according to the first example embodiment of the present invention.

FIGS. 5A and 5B show an example of the structure of the image capture unit 101. FIG. 5A is a cross section view taken along line XX, and FIG. 5B is a top view. The image capture unit 101 of this example includes a camera 161 having a zoom lens 162. The camera 161 may be, for example, a digital camera. The direction of the optical axis of the camera 161 is perpendicular to the face of an object to be identified 164. The object to be identified 164 is placed on a table 165. By tilting or rotating the table 165, a posture of the object to be identified 164 with respect to the camera 161 can be changed. A distance between the camera 161 and the object to be identified 164 is almost constant. The image resolution can be controlled by changing an image capture magnification with the zoom lens 162. Moreover, the image capture unit 101 includes an illuminator 163 whose illumination angle is variable. The illuminator 163 includes illumination units 166 such as LEDs having different positions in the latitude direction (height direction) in eight directions in the longitude direction (circumferential direction). The illumination angle can be controlled by changing the positions of the illumination units 166 to be turned on.

The image storage unit 103 is configured so that an image of an irregular pattern on the surface of an object captured by the image capture unit 101 is stored.

The feature value extraction unit 104 is configured to perform image processing on an image of an irregular pattern on the surface of an object stored in the image storage unit 103 based on an image processing condition set by the condition control unit 102. First, the feature value extraction unit 104 performs the preprocessing described with reference to FIG. 2 on the above image. Next, the feature value extraction unit 104 performs the feature value extraction process described with reference to FIG. 3.

The feature value storage unit 105 is configured so that a feature value extracted by the feature value extraction unit 104 is stored.

The feature value pair generation unit 106 is configured to, from a plurality of feature values of a plurality of objects stored in the feature value storage unit 105, generate a first feature value pair for each of the plurality of objects. The first feature value pair represents that two feature values forming the pair are a pair of feature values extracted from a plurality of images of the same objects. Moreover, the feature value pair generation unit 106 is configured to, from a plurality of feature values of a plurality of objects stored in the feature value storage unit 105, generate a second feature value pair for each of all combinations of the plurality of objects. The second feature value pair represents that two feature values forming the pair are a pair of feature values extracted from a plurality of images of objects different from each other.

The first feature value pair storage unit 107 is configured so that a plurality of first feature value pairs generated by the feature value pair generation unit 106 are stored. The second feature value pair storage unit 108 is configured so that a plurality of second feature value pairs generated by the feature value pair generation unit 106 are stored.

The score calculation unit 109 is configured to calculate the correlation between two feature values and calculate a matching score indicating a degree to which the two feature values are similar. The pair of two feature values to be subject to score calculation are the first feature pair, the second feature pair, and a pair formed by a feature value to be identified and matched extracted by the feature value extraction unit 104 and a reference feature value stored in the feature value storage unit 105. For example, the score calculation unit 109 calculates the score by using the number of corresponding feature value elements between both the feature values. Alternatively, for example, the score calculation unit 109 calculates the score based on the Hamming distance between codes representing both the feature values. The score may be a value increasing as the two feature values are more similar, that is, a value increasing as the distance between the two feature values is smaller, and vice versa. The method of calculating the score is not limited to the above examples.

The distribution generation unit 110 is configured to generate a first distribution that is the distribution of the matching scores of a plurality of first feature value pairs. Moreover, the distribution generation unit 110 is configured to generate a second distribution that is the distribution of the matching scores of a plurality of second feature value pairs. Herein, the first distribution and the second distribution are information that express, in tabular format or graph format, the number of the first feature value pairs and the second feature value pairs appearing in each of the sections obtained by dividing the range of scores.

The distribution storage unit 111 is configured so that the first distribution and the second distribution generated by the distribution generation unit 110 are stored.

The parameter determination unit 113 is configured to calculate a separation degree between the first distribution and the second distribution stored in the distribution storage unit 111. Moreover, the parameter determination unit 113 is configured to determine the values of an image capture parameter and an image processing parameter that are determined in advance based on the calculated separation degree.

The parameter storage unit 114 is configured so that the values of an image capture parameter and an image processing parameter determined by the parameter determination unit 113 are stored in association with the values of data characterizing an object surface.

The judgment unit 116 is configured to generate the result of judgment of identification and matching based on a score calculated by the score calculation unit 109 with respect to a pair formed by a feature value to be identified and matched extracted by the feature value extraction unit 104 and a reference feature value stored in the feature value storage unit 105.

The information presentation unit 116 is configured to present object management information based on the judgment result by the judgment unit 115.

Figure 6:
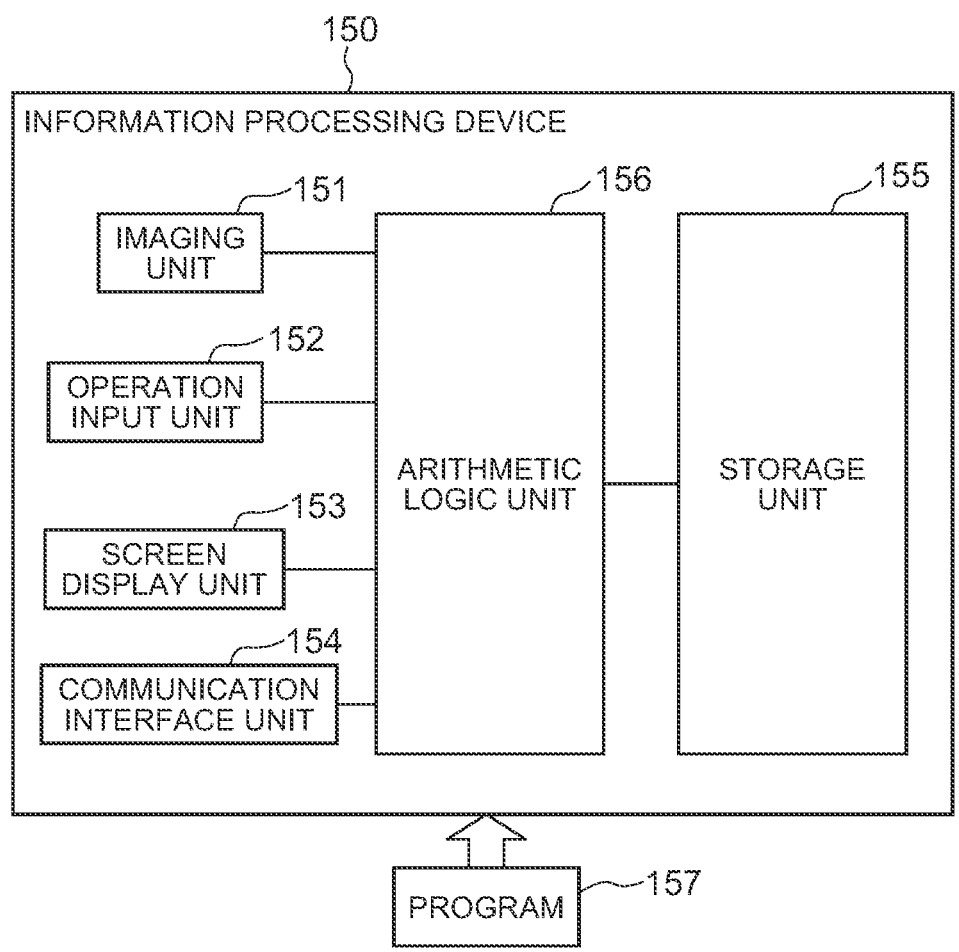
FIG. 6 is a block diagram showing an example of hardware of the individual identification device according to the first example embodiment of the present invention.

The individual identification device 100 can be realized by an information processing device 150 such as a personal computer and a program 157 as shown in FIG. 6, for example. The information processing device 150 includes an imaging unit 151 such as a camera, an operation input unit 152 such as a keyboard and a mouse, a screen display unit 153 such as a liquid crystal display, a communication interface unit 154, a storage unit 155 such as a memory and a hard disk, and an arithmetic logic unit 156 such as one or more microprocessors.

The program 157 is loaded from an external computer-readable recording medium to a memory when the information processing device 150 is started and controls the operation of the arithmetic logic unit 156, thereby realizing functional means on the arithmetic logic unit 156, such as the image capture unit 101, the condition control unit 102, the image storage unit 103, the feature value extraction unit 104, the feature value storage unit 105, the feature value pair generation unit 106, the first feature value pair storage unit 107, the second feature value pair storage unit 108, the score calculation unit 109, the distribution generation unit 110, the distribution storage unit 111, the parameter determination unit 113, the parameter storage unit 114, the judgment unit 115, the information presentation unit 116, and the object information input unit 117.

Next, an operation of the individual identification device 100 according to this example embodiment will be described. The operation of the individual identification device 100 is broadly divided into the following three:

a) a preprocessing operation of determining the values of specific image capture parameter and image processing parameter;

b) an individual registration operation; and c) an individual identification and individual matching operation.

[Preprocessing Operation of Determining the Values of Specific Image Capture Parameter and Image Processing Parameter]

In this example embodiment, the values of two image parameters of an illumination angle and an image resolution are determined in advance. Moreover, in this example embodiment, a set of preprocessing parameters and a set of feature extraction parameters previously determined as specific image processing parameters are determined in advance. The set of preprocessing parameters includes at least one preprocessing parameter. The set of feature extraction parameters includes at least one feature extraction parameter.

A process of determining the values of specific image capture parameter and image processing parameter is executed for each of a plurality of groups obtained by classifying sample objects based on the value of data characterizing an object surface. In this example embodiment, three data of material, surface roughness and shape are used as data characterizing an object surface.

FIG. 7 shows an example of groups of sample objects. In this example, sample objects whose material is metal, surface roughness (Ra) is 0.2 μm and shape is a donut shape form one group. Moreover, sample objects whose material is metal, surface roughness (Ra) is 1.0 μm and shape is flat form another group. Moreover, sample objects whose material is resin, surface roughness (Ra) is 0.45 μm and shape is a circle form still another group.

Figure 8:
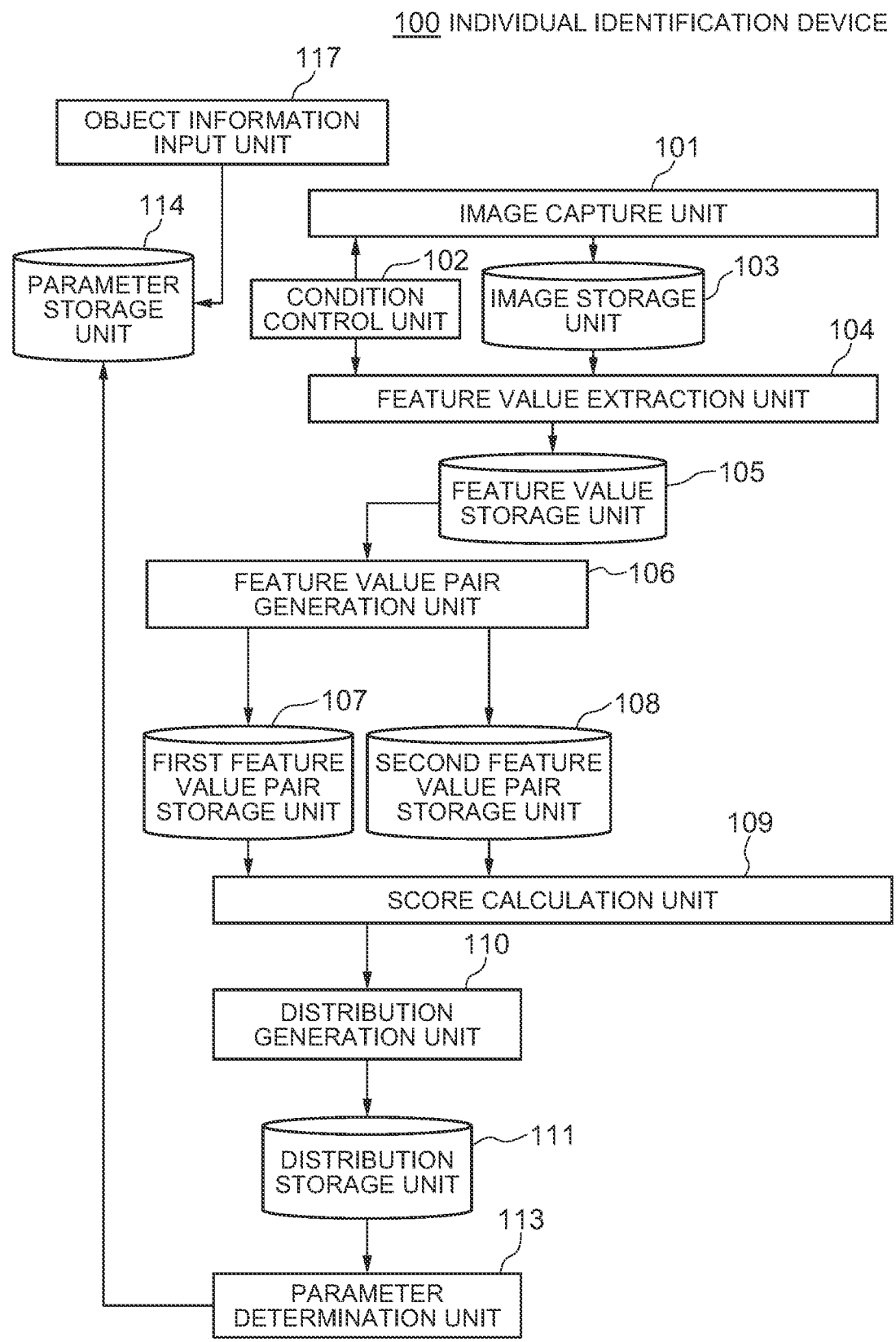
FIG. 8 is an operation flow showing an example of a process of determining the values of specific image capture parameter and image processing parameter in the individual identification device according to the first example embodiment of the present invention.
Figure 9:
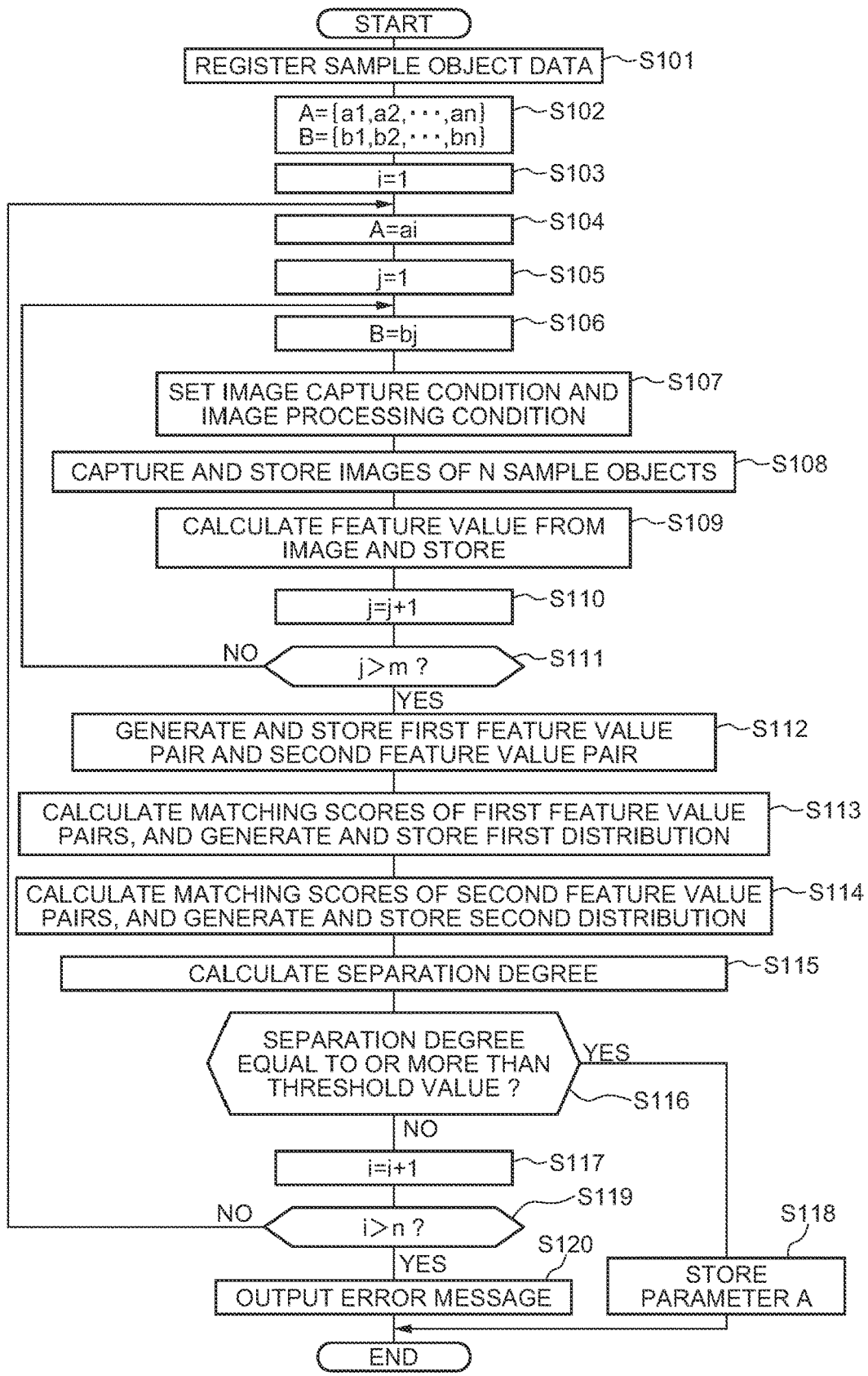
FIG. 9 is a flowchart showing an example of a process of determining the values of specific image capture parameter and image processing parameter in the individual identification device according to the first example embodiment of the present invention.

FIG. 8 is an operation flow showing an example of a process of determining the values of specific image capture parameter and image processing parameter executed for each group. Moreover, FIG. 9 is a flowchart showing the example of the process of determining the values of specific image capture parameter and image processing parameter executed for each group.

First, an operator who manages the preprocessing registers data about a group of sample objects to be processed into the parameter storage unit 114 through the object information input unit 117 (step S101).

FIG. 10 shows an example of the content of the parameter storage unit 114. Referring to FIG. 10, in the parameter storage unit 114, the values of image capture parameters and image processing parameters determined by the parameter determination unit 113 are stored in association with the values of data characterizing an object surface for each group of sample objects. For example, data about one group is composed of a group number, data characterizing an object surface, and parameters. The data characterizing an object surface is composed of three data of material, surface roughness, and shape. The parameters are broadly classified into an image capture parameter and an image processing parameter. The image capture parameter is composed of two parameters of an illumination angle and an image resolution. The image processing parameter is composed of two parameters of a preprocessing parameter set and a feature extraction parameter set. At a moment of input by the operator, the value of each parameter set is a specified value. The specified value will be updated with a value determined by the parameter determination unit 113.

Next, the condition control unit 102 sets a previously determined image capture parameter (in this example, an illumination angle and an image resolution) and a previously determined image processing parameter (in this example, a preprocessing parameter set and a feature extraction parameter set) as a parameter set A, sets a previously determined image capture parameter used as a disturbance factor (in this example, a relative posture of an object and a camera) as a parameter set B, and comprehensively generates the candidates of the value of the parameter set A and the candidates of the value of the parameter set B (step S102). For example, the condition control unit 102 comprehensively generates the candidates of the value of the parameter set A which include the values of the previously determined illumination angle, image resolution, preprocessing parameter set and feature extraction parameter set and in which the value of at least one parameter is different from that of other candidates. Moreover, the condition control unit 102 generates a relative posture of an object and a camera as the candidates of the value of the parameter set B.

FIG. 11 shows an example of the candidates of the value of the parameter set A. In this example, the condition control unit 102 changes the illumination angle from θ1 to θa in a ways, changes the image resolution from m1 to mb in b ways, changes the preprocessing parameter set from pr1 to prc in c ways, and changes the feature extraction parameter set from eq1 to eqd in d ways, thereby generating candidates a1 to an of the value of the parameter set A in a×b×c×d ways.

FIG. 12 shows an example of the candidates of the value of the parameter set B. In this example, the condition control unit 102 changes the posture of an object at the time of image capture in m ways, thereby generating candidates b1 to bm of the value of the parameter set B in m ways.

Next, the condition control unit 102 sets a variable i for selecting the candidate of the value of the parameter set A to 1 (step S103), and selects a candidate a1 of the value of the parameter set A (step S104). Next, the condition control unit 102 sets a variable j for selecting the candidate of the value of the parameter set B to 1 (step S105), and selects a candidate b1 as the parameter set B (step S106). Next, the condition control unit 102 sets an image capture condition (illumination angle, image resolution, posture) determined by the selected candidate a1 and candidate b1 in the image capture unit 101, and sets an image processing condition (preprocessing parameter set, feature extraction parameter set) determined by the selected candidate a1 in the feature value extraction unit 104 (step S107). The setting of an image capture condition in the image capture unit 101 may be automated, or may be manually performed by the user by displaying the image captured parameters on the screen display unit 153. The setting of an image processing condition in the feature value extraction unit 104 may be automated, or may be manually performed by the user by displaying the image processing parameters on the screen display unit 153.

Next, the image capture unit 101 captures images of N (≥2, preferably ≥3) sample objects from a group with group number 1 at least one time for each, and stores the images into the image storage unit 103 (step S108). As a result of the above operation, in the image storage unit 103, N images including images G111, G211, . . . , GN11 shown in FIG. 13, for example, are stored in association with sample object IDs and the image capture conditions and image processing conditions determined by the candidates a1 and b1.

Next, the feature value extraction unit 104 retrieves the images of the N sample objects captured under the image capture condition and image processing condition determined by the candidates a1 and b1 from the image storage unit 103, extracts feature values from the respective images based on the image processing condition determined by the candidate a1, and stores the feature values into the feature value storage unit 105 (step S109). Consequently, in the feature value storage unit 105, N feature values including feature values V111, V211, . . . , VN11 shown in FIG. 14, for example, are stored in association with sample object IDs and the image capture condition and image processing condition determined by the candidates a1 and b1.

Next, the condition control unit 102 increments the variable j (step S110) and, when the variable j is not larger than m, returns to step S106 to repeat the same process as the abovementioned process. As a result, images of the same N sample objects as described above are captured under the image capture condition and image processing condition determined by the candidates a1 and b2, and feature values are extracted from the respective images. The same operation is repeated until the variable j exceeds m (step S111). As a result, in a state where the value of the parameter set A is fixed to a1, while the value of the parameter set B is changed in order of b1, b2, . . . , bm, images of the N sample objects are captured multiple times, respectively, and a feature value is extracted from each of the images. Images G111, G211 . . . , GN11, G112, G212, . . . , GN12, . . . , G11$m$, G21$m$, . . . , GN1$m$ shown in FIG. 13, and feature values V111, V211, . . . , VN11, V112, V212, . . . , VN12, . . . , V11$m$, V21$m$, . . . , VN1$m$ shown in FIG. 14 are images and feature values captured and extracted in the above manner.

Next, the feature value pair generation unit 106 retrieves the feature values V111, V211, . . . , VN11, V112, V212, . . . , VN12, . . . , V11$m$, V21$m$, . . . , VNlm from the feature value storage unit 105, generates a first feature value pair and a second feature value pair, and stores them into the first feature value pair storage unit 107 and the second feature value pair storage unit 108 (step S112). As a result, in the first feature value pair storage unit 107, first feature value pairs shown in FIG. 15, for example, which include a combination of selecting two from m feature values (V111, V112, . . . , V11$m$), a combination of selecting two from m feature values (V211, V212, . . . , V21$m$), . . . , and a combination of selecting two from m feature values (VN11, VN12, . . . , VN1$m$) are stored in association with the candidate a1 of the parameter set A. Moreover, in the second feature value pair storage unit 108, second feature value pairs shown in FIG. 16, for example, which include a combination of a feature value V11$x$ (x=1, 2, . . . , m) and a feature value Viyy (i≠1, y is any value), a combination of a feature value V21$x$ (x=1, 2, . . . , m) and a feature value Viyy (i≠2, y is any value), . . . , and a feature value VN1$x$ (x=1, 2, . . . , m) and a feature value Viyy (i≠N, y is any value) are stored in association with the candidate a1 of the parameter set A.

Next, the score calculation unit 109 retrieves the first feature value pairs associated with the candidate a1 of the parameter set A from the first feature value pair storage unit 107 and calculates the correlation between the feature values forming the pair to calculate a matching score, and the distribution generation unit 110 generates a first distribution from the calculated matching scores of the first feature value pairs and stores the first distribution into the distribution storage unit 111 (step S113). As a result, in the distribution storage unit 111, for example, as shown in FIG. 17, a distribution D11 of the first feature value pairs is stored in association with the candidate a1 of the parameter set A.

Further, the score calculation unit 109 retrieves the second feature value pairs associated with the candidate a1 of the parameter set A from the second feature value pair storage unit 108 and calculates the correlation between the feature values forming the pair to calculated a matching score, and the distribution generation unit 110 generates a second distribution from the calculated matching scores of the second feature value pairs and stores the second distribution into the distribution storage unit 111 (step S114). As a result, in the distribution storage unit 111, for example, as shown in FIG. 17, a distribution D12 of the second feature value pairs is stored in association with the candidate a1 of the parameter set A.

Next, the parameter determination unit 113 retrieves the first distribution D11 and the second distribution D12 from the distribution storage unit 111, calculates the separation degree of the distributions, and stores the separation degree into the distribution storage unit 111 (step S115). Consequently, in the distribution storage unit 111, a separation degree SP1 is stored in association with the candidate a1 of the parameter set A as shown in FIG. 17, for example.

The separation degree SP1 of the two distributions is a scale or an index value representing to what degree the two distributions D11 and D12 separate. As the separation degree, for example, scales as illustrated below can be used.

Example 1 of Scale of Separation Degree

Figure 18:
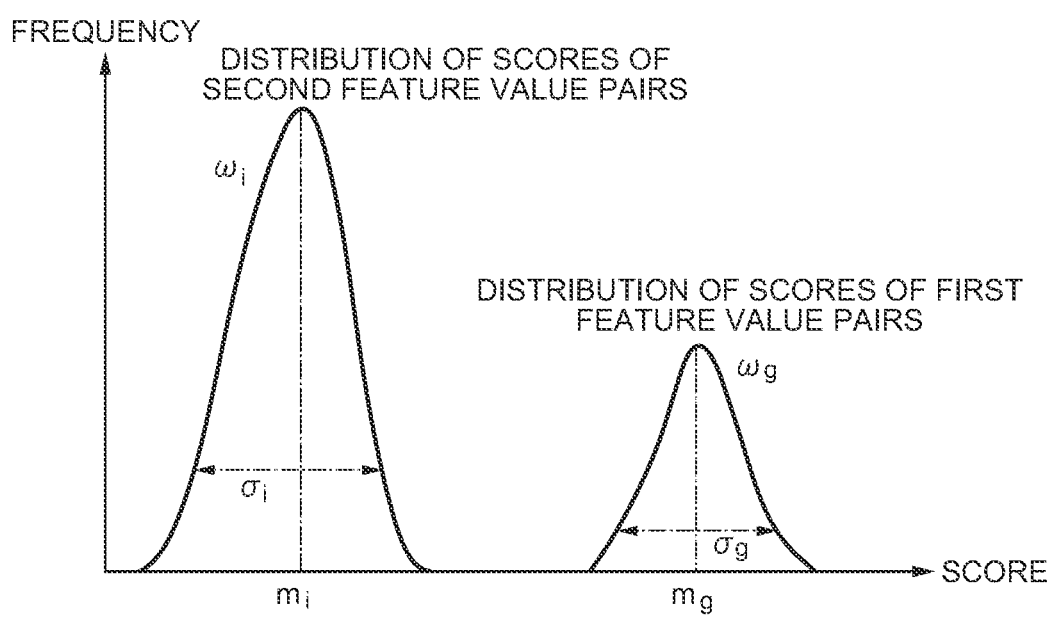
FIG. 18 is a view showing an example of the scale of a separation degree used in the individual identification device according to the first example embodiment of the present invention.

As shown in FIG. 18, when the mean, variance, and number of pairs of the distribution of the scores of the first feature value pairs (first distribution) are $m_g$, $\sigma_g$, and $\omega_g$, respectively, and the mean, variance, and number of pairs of the distribution of the scores of the second feature value pairs (second distribution) are $m_i$, $\sigma_i$, and $\omega_i$ respectively, the intraclass variance $\sigma_w$ and the interclass variance cm are given by the following equations, respectively.

$$\sigma_w = (\omega_g \sigma_g^2 + \omega_i \sigma_i^2)/(\omega_g + \omega_i) \quad (1)$$

$$\sigma_b = \omega_g \omega_i (m_g - m_i)^2/(\omega_g + \omega_i)^2 \quad (2)$$

Then, the ratio between the intraclass variance and the interclass variance given by the following equation can be used as the sale of a separation degree.

$$\text{separation degree} = \text{ratio between intraclass variance and interclass variance} = \sigma_b^2/\sigma_w^2 \quad (3)$$

Example 2 of Scale of Separation Degree

Figure 19:
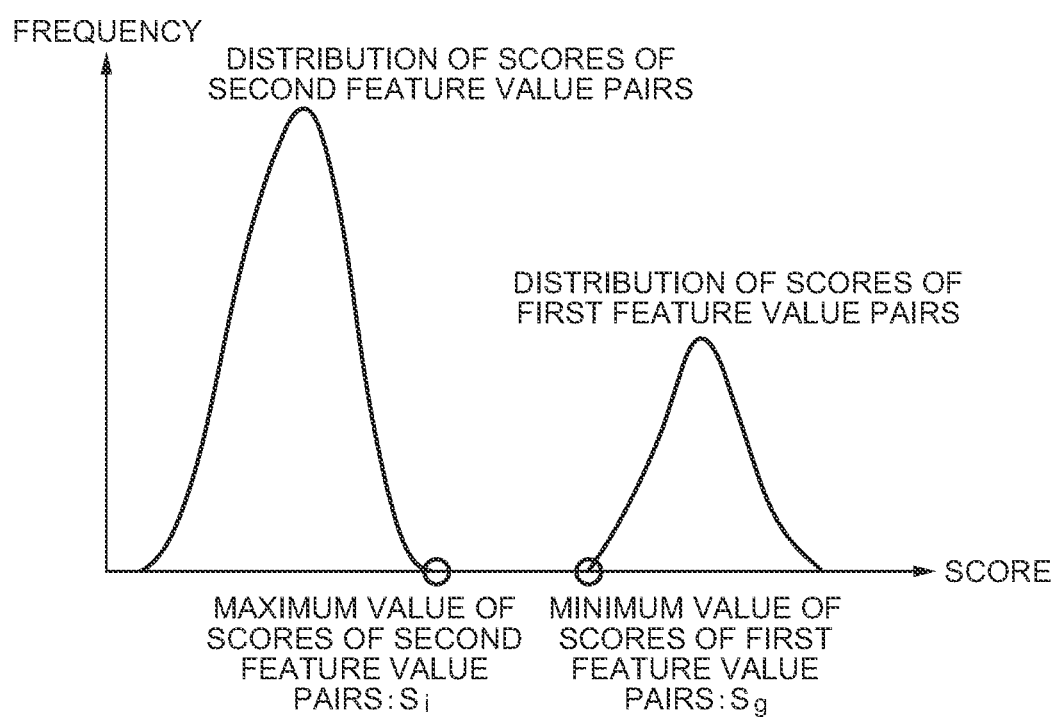
FIG. 19 is a view showing another example the scale of a separation degree used in the individual identification device according to the first example embodiment of the present invention.

As shown in FIG. 19, when the minimum value of the distribution of the scores of the first feature value pairs (first distribution) is $S_g$, and the maximum value of the distribution of the scores of the second feature value pairs (second distribution) is $S_i$, the ratio of the maximum value $S_i$ to the minimum value $S_g$ given by the following equation can be used as the scale of a separation degree.

separation degree=ratio of maximum value of second distribution to minimum value of first distribution=$S_i/S_g$ (4)

Example 3 of Scale of Separation Degree

Figure 20A:
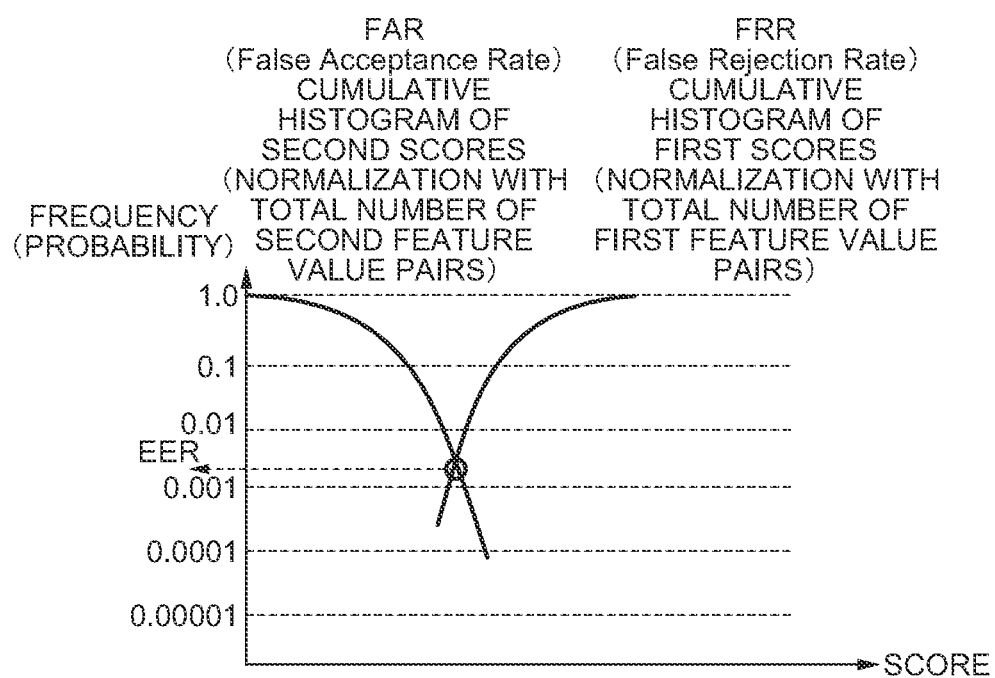
FIG. 20A is a view showing still another example of the scale of a separation degree used in the individual identification device according to the first example embodiment of the present invention.
Figure 20B:
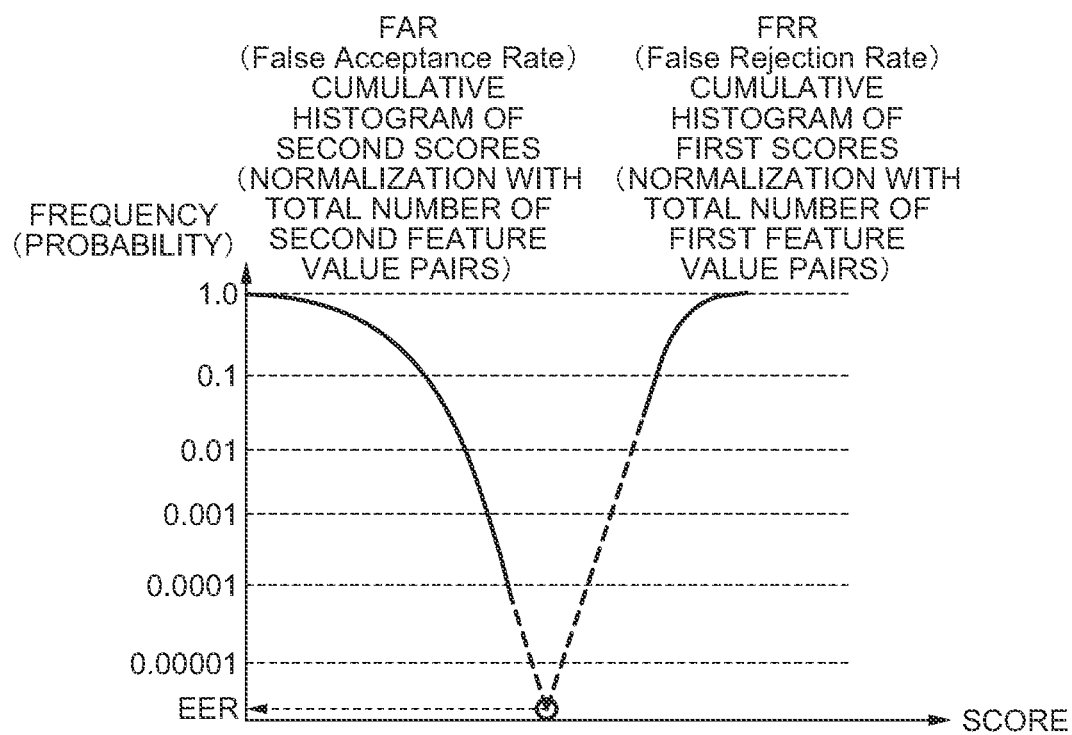
FIG. 20B is a view showing still another example of the scale of a separation degree used in the individual identification device according to the first example embodiment of the present invention.

An EER (Equal Error Rate) where an FRR (False Rejection Rate) obtained from the distribution of the scores of the first feature value pairs is equal to an FAR (False Acceptance Rate) obtained from the distribution of the scores of the second feature value pairs is set as the scale of a separation degree. For example, as shown in FIG. 20A, the FRR can be obtained as a cumulative histogram of the scores of the first feature value pairs (normalization with the total number of the first feature value pairs). Moreover, as shown in FIG. 20A, the FAR can be obtained as a cumulative histogram of the scores of the second feature value pairs (normalization with the total number of the second feature value pairs). Moreover, as shown in FIG. 20A, the EER can be obtained as the frequency (probability) at the intersection of the EER and the FRR. Moreover, as shown in FIG. 20B, in a case where the cumulative histogram of the first scores and the histogram of the second scores are completely separated, the EER can be calculated by extrapolation by a cumulative distribution function that approximates the respective cumulative histograms.

Next, the parameter determination unit 113 compares the calculated separation degree SP1 with a predetermined threshold value, and thereby judges whether the first distribution D11 based on the first feature value pairs and the second distribution D12 based on the second feature value pairs are separated by the threshold value or more (step S116). Then, when the separation degree SP1 between the first distribution D11 and the second distribution D12 is equal to or more than the threshold value, the parameter determination unit 113 stores the values of the image capture parameter and the image processing parameter represented by the candidate a1 of the parameter set A at the time into the parameter storage unit 114 in association with the group number 1 (step S118), and ends the process shown in FIG. 9.

On the other hand, when the separation degree SP1 between the first distribution D11 and the second distribution D12 is less than the threshold value, the parameter determination unit 113 determines that it is impossible to discriminate the N sample objects from each other under the image capture condition and the image processing condition determined by the image capture parameter and the image processing condition represented by the candidate a1 of the parameter set A at the time. Then, the parameter determination unit 113 increments the variable i (step S117), confirms that i is not larger than n (NO at step S119), and returns to step S104. As a result, the same process as the above-mentioned process is repeated with the value of the parameter set A fixed to the candidate a2 (steps S104 to S116).

After that, until either a condition that a candidate of the parameter set A with which the separation degree between the first distribution and the second distribution is equal to or more than the threshold value is found or a condition that the variable i becomes larger than n is first satisfied, the process shown in FIG. 9 is executed. In a case where no candidate of the parameter set A with which the separation degree is equal to or more than the threshold value is found before the variable i becomes larger than n, the parameter determination unit 113 outputs an error message (step S120), and ends the process shown in FIG. 9.

Figure 21:
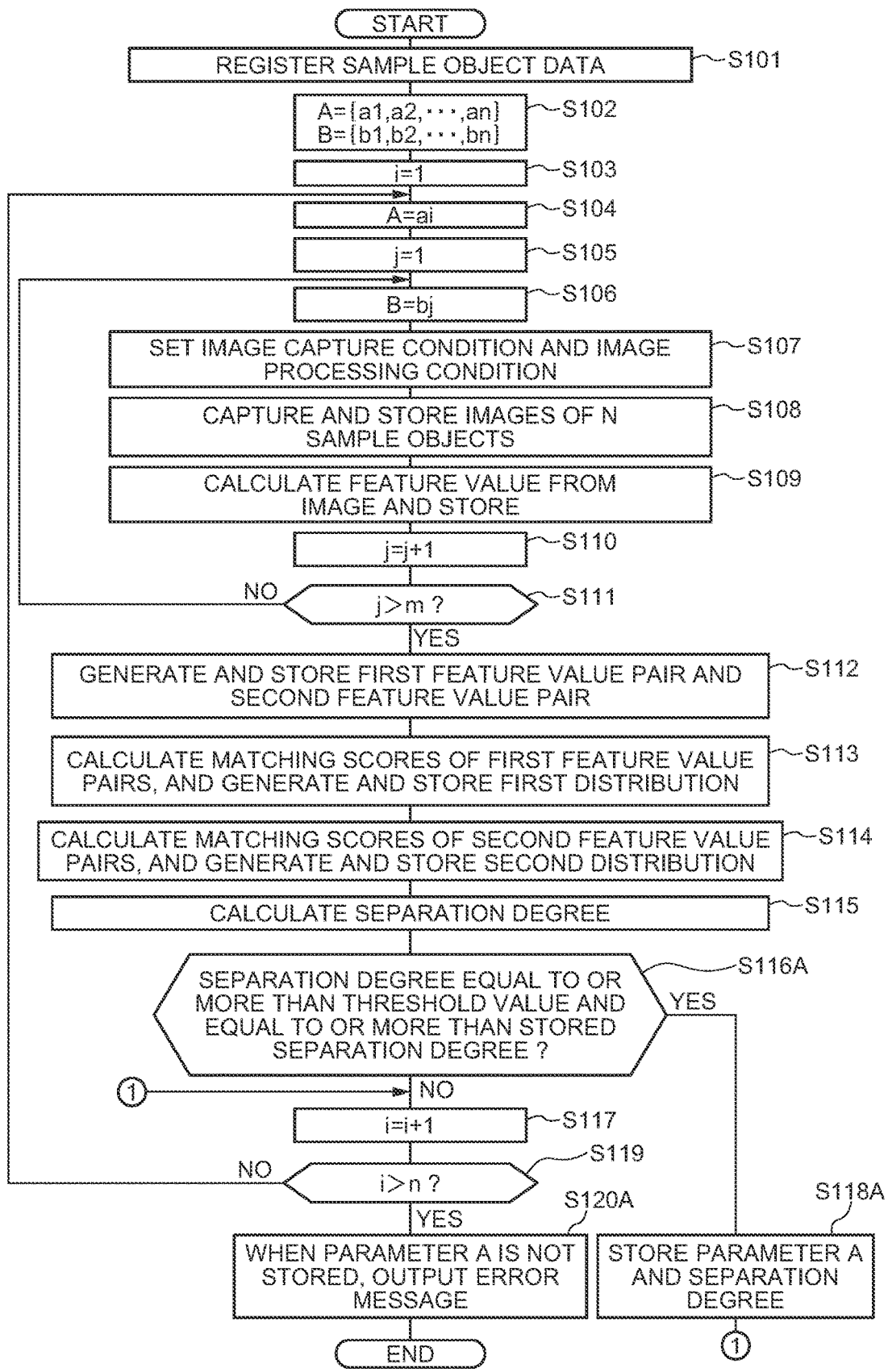
FIG. 21 is a flowchart showing another example of a process of determining the value of a specific image capture parameter in the individual identification device according to the first example embodiment of the present invention.

FIG. 21 is a flowchart showing another example of a process of determining the values of specific image capture parameter and image processing parameter executed for each group. The process shown in FIG. 21 is different from the process shown in FIG. 9 in that steps S116, S118 and S120 are replaced with steps S116A, S118A and S120A, and the same as the process shown in FIG. 9 otherwise.

At step S116A, the parameter determination unit 113 judges whether or not the calculated separation degree is equal to or more than the threshold value and is equal to or more than the separation degree of the candidate of the parameter set A of the same group stored in the parameter storage unit 114. When the calculated separation degree is equal to or more than the threshold value and is equal to or more than the separation degree of the candidate of the parameter set A of the same group stored in the parameter storage unit 114, the parameter determination unit 113 overwrites the candidate of the parameter set A of the same group stored in the parameter storage unit 114 and the separation degree thereof with the current candidate of the parameter set A and the separation degree thereof (step S118A). Then, the parameter determination unit 113 proceeds to step S117. On the other hand, when the calculated separation degree is not equal to or more than the threshold value, or when the calculated separation degree is equal to or more than the threshold value but is not equal to or more than the separation degree of the parameter set A of the same group stored in the parameter storage unit 114, the parameter determination unit 113 skips step S118A and proceeds to step S117.

Then, when judging that the variable i exceeds n at step S119, the parameter determination unit 113 outputs an error message when the candidate of the parameter set A is not stored in the parameter storage unit 114 (step S120A), and ends the process of FIG. 21. When the candidate of the parameter set A is stored in the parameter storage unit 114, the stored candidate becomes a candidate of the parameter set A giving a separation degree which is equal to or more than the threshold value and is the maximum, that is, becomes the values of the image capture parameter and the image processing parameter determined in advance.

[Individual Registration Operation]

Next, an individual registration operation of registering each object to be managed will be described.

Figure 22:
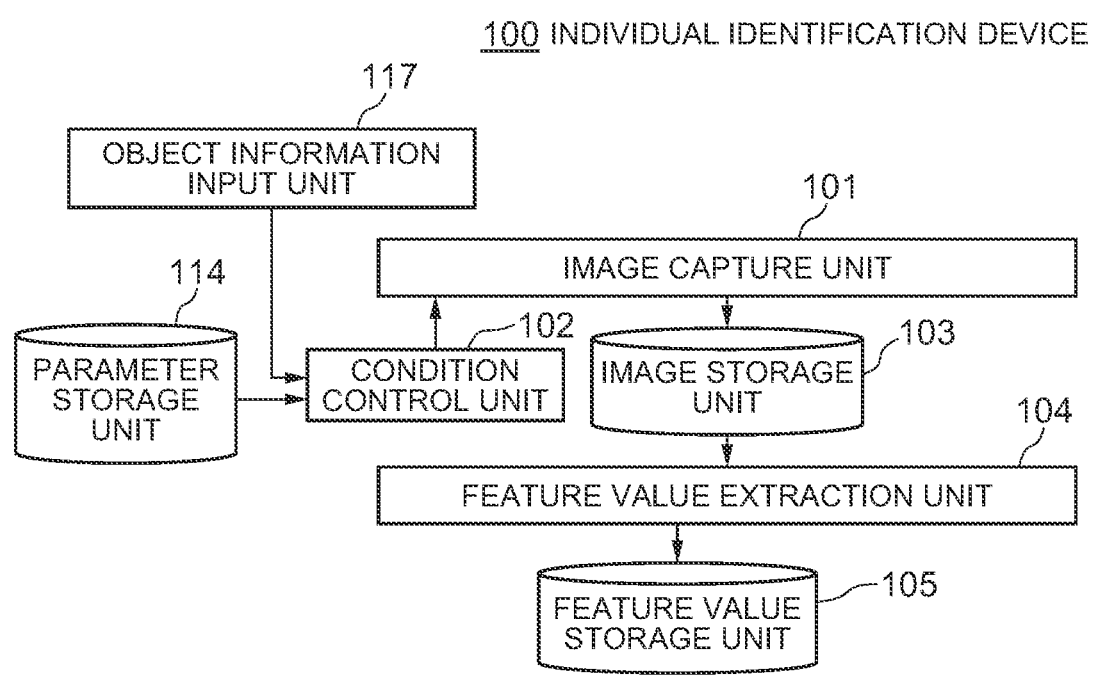
FIG. 22 is an operation flow showing an example of individual registration in the individual identification device according to the first example embodiment of the present invention.
Figure 23:
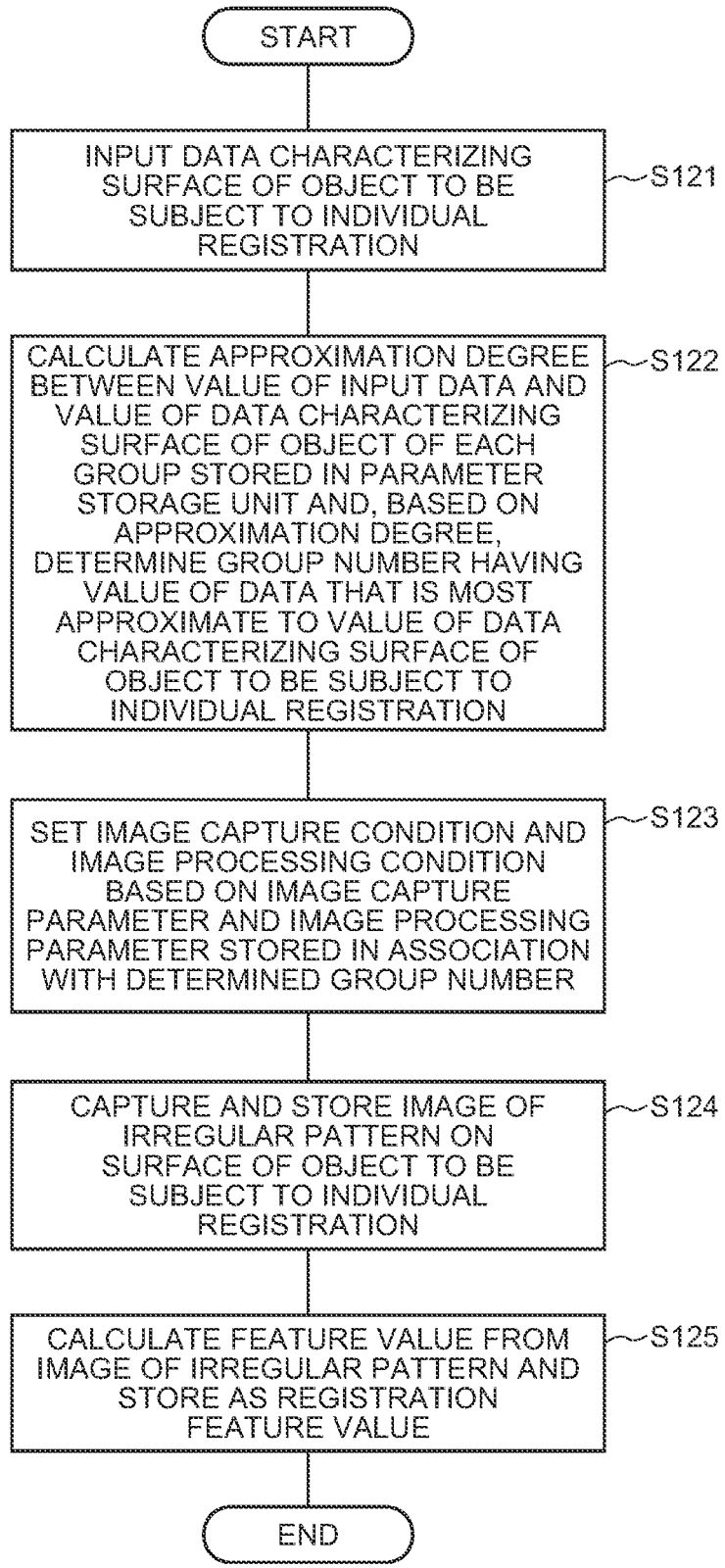
FIG. 23 is a flowchart showing an example of individual registration in the individual identification device according to the first example embodiment of the present invention.

FIGS. 22 and 23 are a process flow and a flowchart of the individual registration operation. First, an operator who manages individual registration inputs the value of data characterizing the surface of an object to be registered into the condition control unit 102 through the object information input unit 117 (step S121). In the case of this example embodiment, three data of the material of an object surface, the roughness of an object surface, and the shape are input.

The condition control unit 102 calculates an approximation degree between the value of the data characterizing the surface of the object to be registered input from the object information input unit 117 and the value of data characterizing the surface of an object of each group stored in the parameter storage unit 114 and, based on the calculated approximation degree, determines a group number having the value of data which is the most approximate to the value of the data characterizing the surface of the object to be registered (step S122). A method of calculating an approximation degree between data characterizing surfaces may be any method that enables quantitative comparison of the approximation degree between the data. For example, a method as shown below can be employed, but the calculation method is not limited thereto. Herein, the material, surface roughness and shape that characterize the surface of an object to be registered will be referred to as a first material, a first surface roughness and a first shape, respectively. Moreover, the material, surface roughness and shape that characterize the surface of an object of each group stored in the parameter storage unit 114 will be referred to as a second material, a second surface roughness and a second shape, respectively. Moreover, the approximation degree indicates more approximation as it is closer to 0.

<Approximation Degree Calculation Method 1>

A material point is given based on the result of comparison between the first material and the second material, a surface roughness point is given based on the result of comparison between the first surface roughness and the second surface roughness, a shape point is given based on the result of comparison between the first shape and the second shape, and the sum of the material point, the surface roughness point, and the shape point is used as an approximation degree. As the material point, the maximum value of material points (for example, 1 point) is given when the first material and the second material match, and the minimum value (for example, 0 point) is given when not match. As the surface roughness point, the maximum value of surface roughness points (for example, 1 point) is given when the first surface roughness and the second surface roughness match. When the first surface roughness and the second surface roughness do not match, any of 0 to 0.9 points is given depending on to what extent they do not match. For example, 0 point is given when the difference or ratio between the two is not within a predetermined threshold value range. When the difference or ratio between the two is within the range, a given point is closer to 0.9 as the difference of the two is closer to 0 or the ratio between the two is closer to 1. Moreover, as the shape point, the maximum value of shape points (for example, 1 point) is given when the first shape and the second shape match, and the minimum value (for example, 0 point) is given when not match. Then, a group number with the smallest approximation degree, which is the sum of the material point, the surface roughness point, and the shape point, is determined.

<Approximation Degree Calculation Method 2>

The sum of points obtained by multiplying the material point, the surface roughness point and the shape point calculated by the same method as the approximation degree calculation method 1 by a material weight, a surface roughness weight, and a shape weight, respectively, is used as an approximation degree. The more important the element is, the larger the value of the weight is. For example, the material weight is the largest, the surface roughness weight is the next largest, and the shape weight is the smallest. Alternatively, the surface roughness weight is the largest, the material weight is the second largest, and the shape weight is the smallest.

Next, the condition control unit 102 retrieves the values of an image capture parameter and an image processing parameter corresponding to the determined group number from the parameter storage unit 114, sets an image capture condition determined by the value of the image capture parameter in the image capture unit 101, and sets an image processing condition determined by the value of the image processing parameter in the feature value extraction unit 104 (step S123). For example, in a case where the determined group number is 1, the condition control unit 102 sets an illumination angle and an image resolution stored in association with the group number 1 in the image capture unit 101, and sets the values of a preprocessing parameter and a feature extraction parameter stored in association with the group number 1 in the feature value extraction unit 104. The setting of the imaging condition in the image capture unit 101 may be automated, or may be performed manually by the operator by displaying the image capture condition on the screen display unit 153. Moreover, the setting of the image processing condition in the feature value extraction unit 104 may be automated, or may be performed manually by the operator by displaying the image processing condition on the screen display unit 153.

Next, the image capture unit 101 captures an image of an irregular pattern on the surface of an object to be registered at least one time under the set imaging condition, and stores the image into the image storage unit 103 (step S124).

Next, the feature value extraction unit 104 retrieves the image of the irregular pattern on the surface of the object to be registered stored in the image storage unit 103, performs image processing on the image and extracts a feature value based on the set image processing condition, and stores the extracted feature value into the feature value storage unit 105 as a registered feature value (step S125). At the time, in the feature value storage unit 105, an individual-specific feature value is registered so as to be linked to (associated with) information relating to the object to be registered such as the ID number of the individual to be registered, time and date of registration, dimensions, and product specification (also referred to as supplementary information). Thus, it becomes possible to present individual management information of an object such as a product based on the result of judgment of individual identification and individual authentication to be described later.

When further registering another individual, the operation from step S121 to step S125 is repeated for the number of individuals to be registered.

FIG. 24 shows an example of the content of individual registration information stored in the feature value storage unit 105. Feature values PF1, PF2, ..., PFn and supplementary information SI1, SI2, ..., SIn are, respectively, feature values and supplementary information that correspond one-to-one to an individual to be registered.

[Individual Identification and Individual Matching Operation]

Next, an operation of identifying and matching individual objects will be described.

Figure 25:
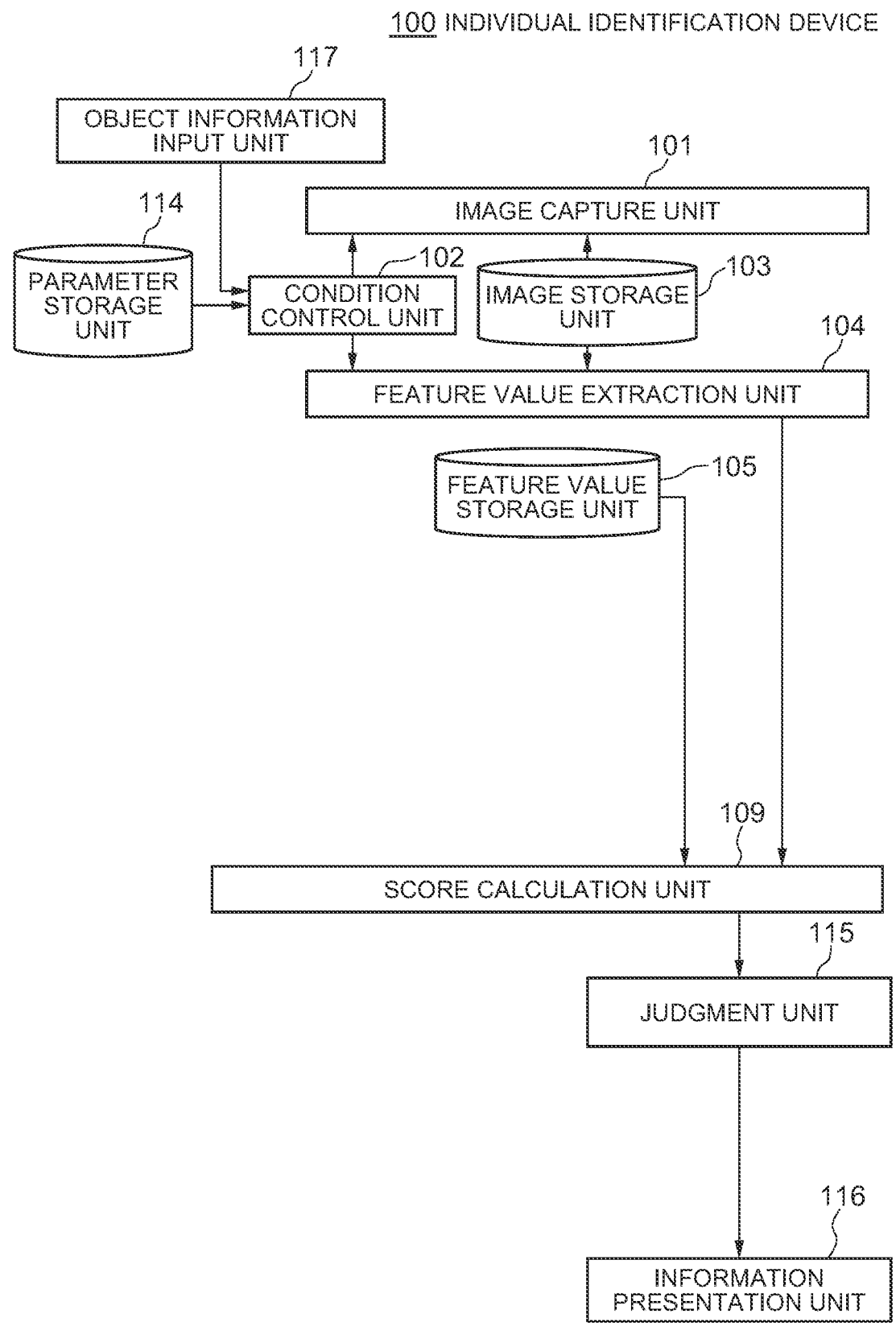
FIG. 25 is an operation flow of individual identification and individual matching in the individual identification device according to the first example embodiment of the present invention.
Figure 26:
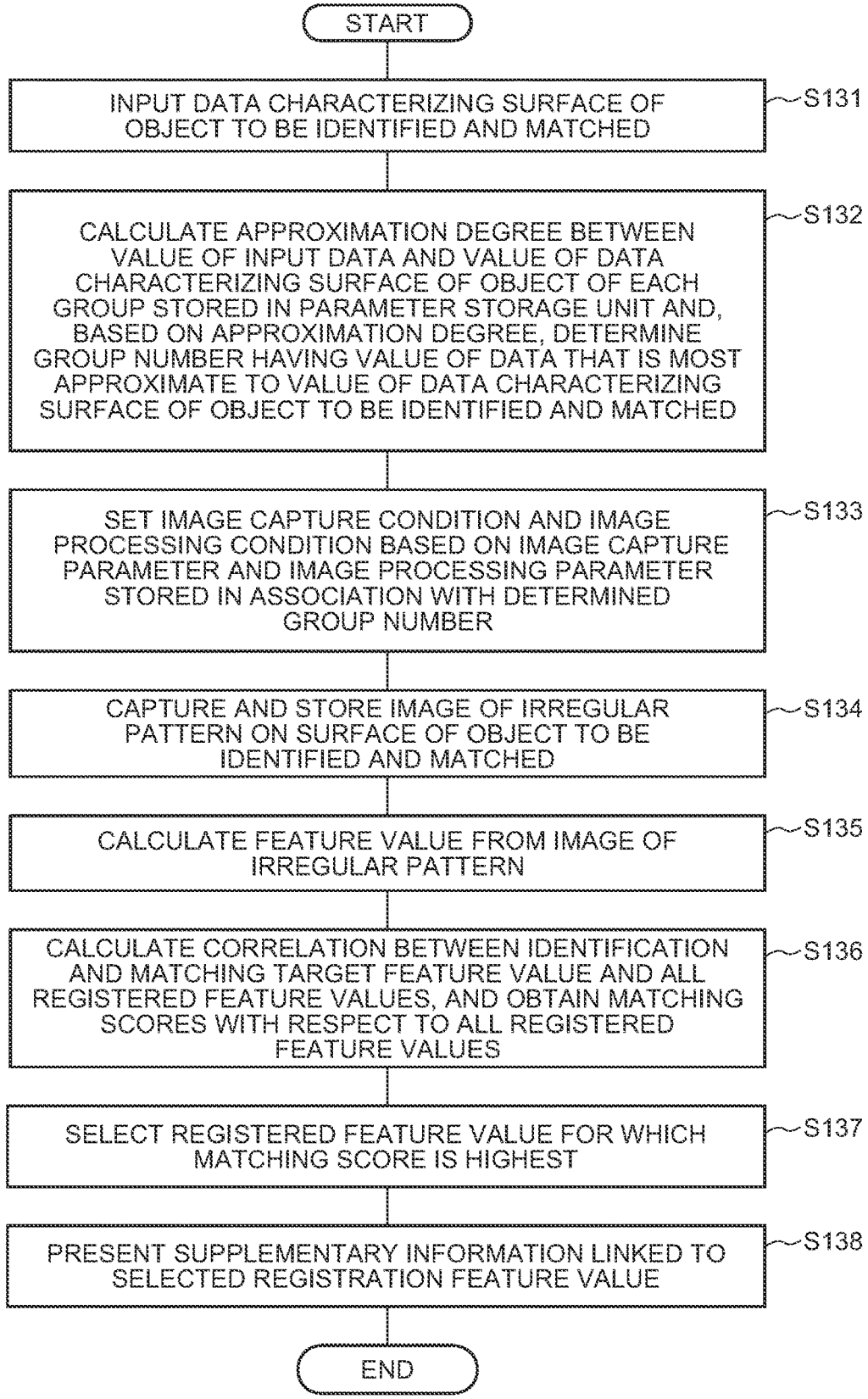
FIG. 26 is a flowchart showing an example of a process of individual identification and individual matching in the individual identification device according to the first example embodiment of the present invention.

FIGS. 25 and 26 are a process flow and a flowchart of an operation at the time of individual identification and individual matching. First, an operator who manages individual identification and matching inputs the value of data characterizing the surface of an object to be identified and matched into the condition control unit 102 through the object information input unit 117 (step S131). In the case of this example embodiment, the operator inputs three data of the material of an object surface, the roughness of an object surface, and the shape.

The condition control unit 102 calculates an approximation degree between the value of the data characterizing the surface of the object to be identified and matched input from the object information input unit 117 and the value of data characterizing the surface of an object of each group stored in the parameter storage unit 114, and determines a group number having a value of data that is the most approximate to the value of the data characterizing the surface of the object to be identified and matched based on the approximation degree (step S132). As a method of calculating the approximation degree between data characterizing surfaces, the same method as in individual registration can be used.

Next, the condition control unit 102 retrieves the values of an image capture parameter and an image processing parameter corresponding to the determined group number from the parameter storage unit 114, sets an image capture condition determined by the value of the image capture parameter in the image capture unit 101, and sets an image processing condition determined by the value of the image processing parameter in the feature value extraction unit 104 (step S133). For example, in a case where the determined group number is 1, the condition control unit 102 sets an illumination angle and an image resolution stored in association with the group number 1 in the image capture unit 101, and sets the values of a preprocessing parameter and a feature extraction parameter stored in association with the group number 1 in the feature value extraction unit 104. The setting of the image capture condition in the image capture unit 101 may be automated, or may be performed manually by the operator by displaying the image capture condition on the screen display unit 153. Moreover, the setting of the image processing condition in the feature value extraction unit 104 may be automated, or may be performed manually by the operator by displaying the image processing condition on the screen display unit 153.

Next, the image capture unit 101 captures an image of an irregular pattern on the surface of the object to be identified and matched at least one time under the set image capture condition, and stores the image into the image storage unit 103 (step S134).

Next, the feature value extraction unit 104 retrieves the image of the irregular pattern on the surface of the object to be identified and matched stored in the image storage unit 103, performs image processing on the image and extracts a feature value based on the set image processing condition, and outputs the feature value to the score calculation unit 109 (step S135). The feature value output from the feature value extraction unit 104 to the score calculation unit 109 at the time will be referred to as an individual identification and matching target feature value hereinafter.

Next, the score calculation unit 109 calculates the correlation between the individual identification and matching target feature value and all feature values PF1 to PFn registered in the feature value storage unit 105, and calculates matching scores for all the feature values PF1 to PFn (step S136). Next, the judgment unit 115 judges what feature value stored in the feature value storage unit 105 agrees the individual identification and matching target feature value based on the matching scores calculated by the score calculation unit 109. For example, the judgment unit 115 sorts the matching scores between the individual identification and matching target feature value and all the registered feature values, and selects a feature value for which the matching score is the maximum (the correlation is the maximum) (step S137). Then, the judgment unit 115 retrieves supplementary information linked to the selected feature value from the feature value storage unit 105, and outputs as product information of the product to be identified and matched.

Further, the judgment unit 115 may perform judgment whether or not to exceed a preset threshold value with respect to the matching scores between the individual identification and matching target feature value and all the feature values stored in the feature value storage unit 105. Then, in a case where none of the matching scores between the individual identification and matching target feature value and all the feature values stored in the feature value storage unit 105 does not exceed the threshold value, the judgment unit 115 judges that the product to be identified and matched is not registered, and outputs information representing an authentication error. The judgment unit 115 operating as described above can be used for the purpose of individual authentication such as authenticity judgment of an object to be identified.

Subsequently, the information presentation unit 116 receives the product information and the authentication error information from the judgment unit 115, and displays the product information that is the result of individual identification of the product to be identified and matched and individual authentication information on a display device (not shown) or outputs to an external terminal (step S138).

Next, an effect of this example embodiment will be described.

According to this example embodiment, an image capture condition can be set with respect to an object for which an image capture condition is not specified in advance when the object has a surface which is very similar to that of an object for which an image capture condition is specified in advance. The reason is that the individual identification device includes the parameter storage unit 114 and the condition control unit 102. In the parameter storage unit 114, the value of an image capture parameter is stored in association with the value of data characterizing the surface of an object for which an image capture condition is specified in advance. When the value of data characterizing the surface of an object to be subject to individual identification is input, the condition control unit 102 acquires the value of an image capture parameter associated with the value of data that is approximate to the input value of the data from the parameter storage unit 114, and sets the image capture condition. That is to say, the fact is used that optimum image capture conditions are the same for objects having similar values of data such as material, roughness and shape that characterize an object surface.

Further, according to this example embodiment, an image processing condition can be set with respect to an object for which an image processing condition is not specified in advance when the object has a surface which is very similar to that of an object for which an image processing condition is specified in advance. The reason is that the individual identification device includes the parameter storage unit 114 and the condition control unit 102. In the parameter storage unit 114, the value of an image processing parameter is stored in association with the value of data characterizing the surface of an object for which an image processing condition is specified in advance. When the value of data characterizing the surface of an object to be subject to individual identification is input, the condition control unit 102 acquires the value of an image processing parameter associated with the value of data that is approximate to the input value of the data from the parameter storage unit 114, and sets the image processing condition. That is to say, the fact is used that optimum image processing conditions are the same for objects having similar values of data such as material, roughness and shape that characterize an object surface.

Further, according to this example embodiment, it is possible to determine an image capture condition and an image processing condition that are useful for discrimination between a plurality of types of objects which are similar to each other. The reason is that the individual identification device includes the image capture unit 101, the feature value extraction unit 104, the feature value pair generation unit

106, the distribution generation unit 110, and the parameter determination unit 113. The image capture unit 101 sets the value of a specific parameter set A among a plurality of types of image capture parameters and image processing parameters as a certain candidate value, and acquires a plurality of images obtained by, while changing the value of a parameter set B that is a disturbance factor such as the posture of an object at the time of image capture, capturing an image of each of N types of objects (N≥2, preferably N≥3) multiple times, respectively. The feature value extraction unit 104 extracts a feature value from each of the plurality of images. The feature value pair generation unit 106 generates a feature value pair in which two feature values forming the pair are extracted from a plurality of images of the same type of objects, as a first feature value pair, for each of the N types of objects. Moreover, the feature value pair generation unit 106 generates a feature value pair in which two feature values forming the pair are extracted from a plurality of images of mutually different types of objects, as a second feature value pair, for each of all combinations of the N types of objects. The distribution generation unit 110 generates a first distribution that is the distribution of the matching scores of the first feature value pairs, and generates a second distribution that is the distribution of the matching scores of the second feature value pairs. The parameter determination unit 113 determines whether or not to adopt the candidate value of the parameter set A based on the separation degree between the first distribution and the second distribution.

MODIFIED EXAMPLE 1 OF THIS EXAMPLE EMBODIMENT

In the above description, two feature values forming a first feature value pair are feature values extracted from a plurality of images obtained by capturing objects that are physically the same. Moreover, in the above description, two feature values forming a second feature value pair are feature values extracted from a plurality of images obtained by capturing objects that are physically different from each other. Meanwhile, as a modified example of this example embodiment, two feature values forming a first feature value pair may be feature values extracted from a plurality of images obtained by capturing objects that are physically identical or different produced on the same production line or produced with the same production die, and two feature values forming a second feature value pair may be feature values extracted from a plurality of images obtained by capturing objects that are physically different from each other produced on different production lines or produced with different production dies.

Herein, a production die refers to a die or a cutting device used for producing a product by casting or heading, or by cutting or the like. A production line refers to a process of producing a product by an assembly line using one or more production dies.

For example, it is assumed that products are produced in large volume by casting or heading with a production die X1 and, in parallel to this, products are produced in large volume by casting or heading with a production die X2, which is a die identical to the production die X1. Here, a pattern specific to the production die X1 is transferred to the entire surface of the product produced with the production die X1. Moreover, a pattern specific to the production die X2 is transferred to the entire surface of the product produced with the production die X2.

Further, for example, it is assumed that products are produced in large volume by cutting a material with a cutting device Y1 and, in parallel to this, products are produced in large volume by cutting a material with a cutting device Y2, which is a cutting device identical to the cutting device Y1. Here, fine irregularities of surface roughness specific to the cross section of a blade of the cutting device Y1 used for cutting appears on a cut face of the product produced with the cutting device Y1. Moreover, fine irregularities of surface roughness specific to the cross section of a blade of the cutting device Y2 used for cutting appears on a cut face of the product produced with the cutting device Y2. The same processing method and device mentioned here are just examples, and other same production processes and processing devices can be handled in the same manner.

According to this modified example, it is possible to determine an image capture condition useful for identification of a production line or a production die used in production of an object. Moreover, a feature value extracted from an image obtained by capturing an image of the object under the determined image capture condition is specific to the production line or production die used in production of the object. Therefore, use of such a feature value for identification and matching enables identification on what production line or with what production die a product has been produced and enables matching.

MODIFIED EXAMPLE 2 OF THIS EXAMPLE EMBODIMENT

The individual identification device 100 is configured to determine a specific image capture parameter and image processing parameter through the process shown in FIG. 9 or 21. However, as another modified example, the individual identification device 100 may be configured to determine a specific image capture parameter through the process shown in FIG. 9 or 21 and use a fixed value determined in advance as an image processing parameter.

SECOND EXAMPLE EMBODIMENT

Figure 27:
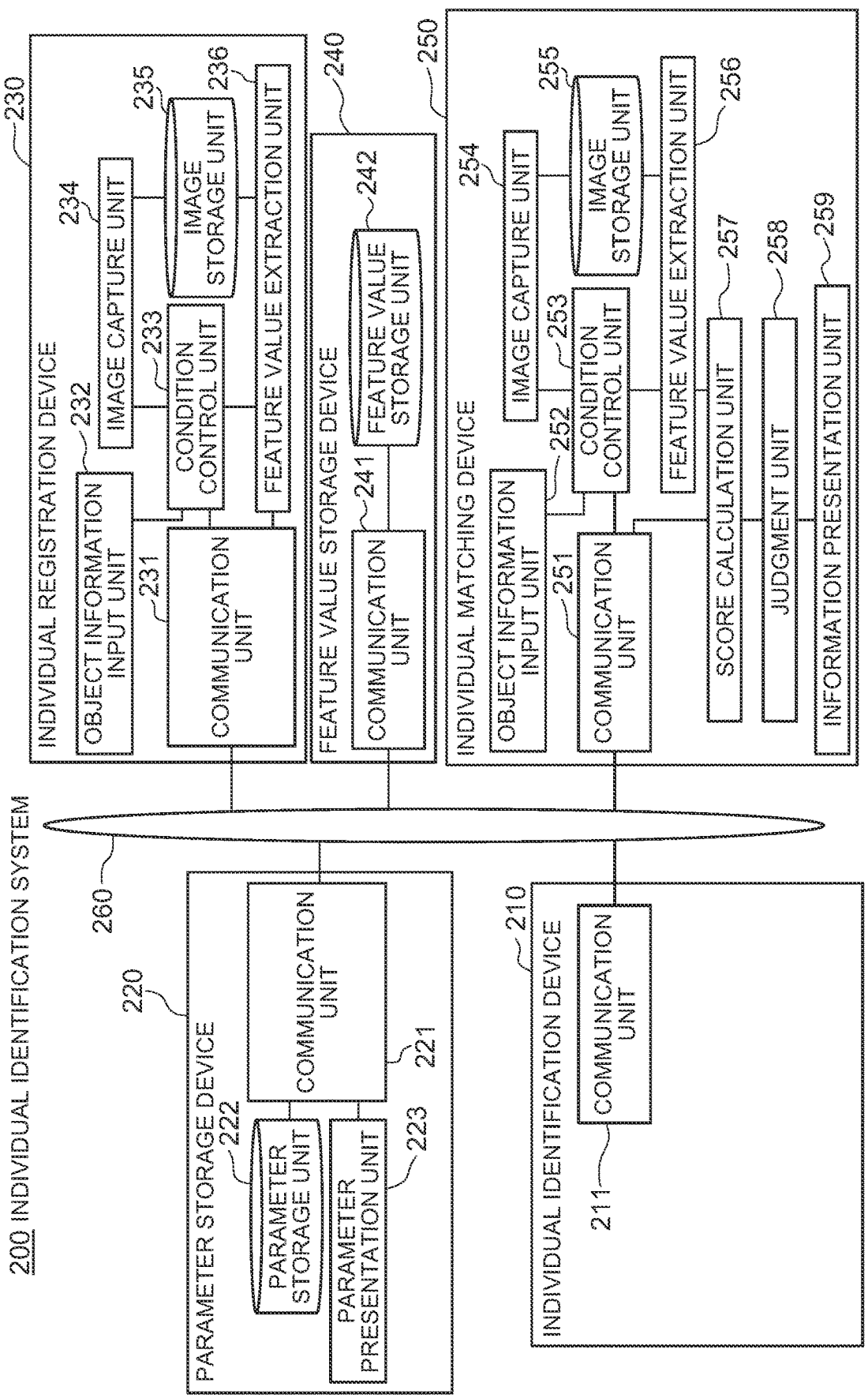
FIG. 27 is a block diagram of an individual identification system according to a second example embodiment of the present invention.

Referring to FIG. 27, an individual identification system 200 according to a second example embodiment of the present invention includes an individual identification device 210, a parameter storage device 220, an individual registration device 230, a feature value storage device 240, an individual matching device 250, and a network 260 connecting the devices so as to enable them to communicate with each other.

The individual identification device 210 is different from the individual identification device 100 according to the first example embodiment described with reference to FIG. 4 in that the parameter storage unit 114 is not included and a communication unit 211 is included, and has the same configuration as the individual identification device 100 except for the above. The communication unit 211 is configured to transmit and receive data to and from another device such as the parameter storage device 220 connected to the network 260.

The parameter storage device 220 includes a communication unit 211, a parameter storage unit 222, and a parameter presentation unit 223. The communication unit 221 is configured to transmit and receive data to and from another device such as the individual identification device 210 connected to the network 260. The parameter storage unit 222 is configured so that the values of an image capture parameter and an image processing parameter are stored in association with the value of data characterizing an object surface as with the parameter storage unit 114 of the individual identification device 100 according to the first example embodiment described with reference to FIG. 4. The parameter presentation unit 223 is configured to receive a parameter inquiry request with designation of the value of data characterizing an object surface, from another device such as the individual registration device 230 through the communication unit 221. Moreover, the parameter presentation unit 223 is configured to, when receiving the parameter inquiry request, acquire the values of an image capture parameter and an image processing parameter stored in association with the value of data characterizing an object surface that is approximate to the designated value of the data characterizing an object surface, from the parameter storage unit 222. Moreover, the parameter presentation unit 223 is configured to transmit a response including the acquired values of the image capture parameter and image processing parameter to the device having transmitted the parameter inquiry request, through the communication unit 221.

The individual registration device 230 includes a communication unit 231, an object information input unit 232, a condition control unit 233, an image capture unit 234, an image storage unit 235, and a feature value extraction unit 236. The communication unit 231 is configured to transmit and receive data to and from another device such as the feature value storage device 240 connected to the network 260. The object information input unit 232, the condition control unit 233, the image capture unit 234, the image storage unit 235, and the feature value extraction unit 236 are configured in the same manner as the object information input unit 117, the condition control unit 102, the image capture unit 101, the image storage unit 103, and the feature value extraction unit 104 in the individual identification device 100 according to the first example embodiment described with reference to FIG. 4.

The feature value storage device 240 includes a communication unit 241 and a feature value storage unit 242. The communication unit 241 is configured to transmit and receive data to and from another device such as the individual registration device 230 connected to the network 260. The feature value storage unit 242 is configured so that a feature value extracted from an image obtained by capturing an object is stored as with the feature value storage unit 105 of the individual identification device 100 according to the first example embodiment described with reference to FIG. 4.

The individual matching device 250 includes a communication unit 251, an object information input unit 252, a condition control unit 253, an image capture unit 254, an image storage unit 255, a feature value extraction unit 256, a score calculation unit 257, a judgment unit 258, and an information presentation unit 259. The communication unit 251 is configured to transmit and receive data to and from another device such as the feature value storage device 240 connected to the network 260. The object information input unit 252, the condition control unit 253, the image capture unit 254, the image storage unit 255, the feature value extraction unit 256, the score calculation unit 257, the judgment unit 258, and the information presentation unit 259 are configured in the same manner as the object information input unit 117, the condition control unit 102, the image capture unit 101, the image storage unit 103, the feature value extraction unit 104, the score calculation unit 109, the judgment unit 115, and the information presentation unit 116 in the individual identification device 100 according to the first example embodiment described with reference to FIG. 4.

Next, an operation of the individual identification system 200 according to this example embodiment will be described. The operation of the individual identification system 200 is broadly divided into the following three;
a) a preprocessing operation of determining the values of a specific image capture parameter and image processing parameter,
b) an individual registration operation, and
c) an individual identification and individual matching operation.

[Preprocessing Operation of Determining the Values of Specific Image Capture Parameter and Image Processing Parameter]

This operation is performed by the individual identification device 210. The operation of the individual identification device 210 at the time is basically the same as the preprocessing operation in the individual identification device 100, except that an operation of transmitting correspondence information between the values of the specific image capture parameter and image processing parameter determined in the individual identification device 210 and the value of data characterizing an object surface to the parameter storage device 220 via the network 260 by the communication unit 211 is performed.

The parameter storage unit 222 in the parameter storage device 220 receives the correspondence information between the values of the specific image capture parameter and image processing parameter and the value of the data characterizing an object surface from the individual identification device 210 through the communication unit 221, and has the correspondence information stored therein. Consequently, in the parameter storage unit 222, the same data as, for example, the data shown in FIG. 10 is stored, that is, the value of the image capture parameter (in the example of FIG. 10, illumination angle, image resolution) and the value of the image processing parameter (in the example of FIG. 10, the values of a preprocessing parameter set and a feature value extraction parameter set) are stored in association with the data characterizing an object surface (in the example of FIG. 10, material, surface roughness, shape).

[Individual Registration Operation]

This operation is performed by the individual registration device 230. First, an operator who manages individual registration inputs data characterizing the surface of an object to be subject to individual registration into the condition control unit 233 through the object information input unit 232. For example, the surface material, surface roughness and shape of the object are input. Next, the condition control unit 233 transmits a parameter inquiry request with designated data characterizing an object surface input from the object information input unit 232 to the parameter presentation unit 223 of the parameter storage device 220 through the communication unit 231, the network 260, and the communication unit 221. The parameter presentation unit 223 acquires the values of an image capture parameter and an image processing parameter stored in association with the value of data that is approximate to the value of the data characterizing an object surface designated in the received parameter inquiry request from the parameter storage unit 222, and transmits a response including the acquired values of the image capture parameter and image processing parameter to the condition control unit 233 through the communication unit 221, the network 260, and the communication unit 231. The condition control unit 233 sets an image capture condition determined by the value of the image capture parameter included in the received response in the image capture unit 234, and also sets an image processing condition determined by the value of the image processing parameter included in the received response in the feature value extraction unit 236. Next, the image capture unit 234 captures an image of an irregular pattern on the surface of the object to be subject to individual registration under the set image capture condition, and stores the image into the image storage unit 235. Next, the feature value extraction unit 236 retrieves the image of the irregular pattern on the surface of the object to be subject to individual registration stored in the image storage unit 235, and extracts a feature value from the image based on the set image processing condition. Next, the feature value extraction unit 236 transmits the extracted feature value and supplementary information relating to the object to be registered to the feature value storage unit 242 of the feature value storage device 240 through the communication unit 231, the network 260, and the communication unit 241. The feature value storage unit 242 has the received feature value stored therein in association with the received supplementary information. Consequently, in the feature value storage unit 242, the same data as, for example, the data shown in FIG. 23 is stored, that is, the feature value and the supplementary information corresponding one by one to the individual to be registered are registered.

[Individual Identification and Individual Matching Operation]

This operation is performed by the individual matching device 250. First, an operator who manages individual identification and individual matching inputs data characterizing the surface of an object to be subject to individual identification and individual matching into the condition control unit 253 through the object information input unit 252. Next, the condition control unit 253 transmits a parameter inquiry request with the designated data characterizing the surface of the object input from the object information input unit 252 to the parameter presentation unit 223 of the parameter storage device 220 through the communication unit 251, the network 260, and the communication unit 221. The parameter presentation unit 223 acquires the values of image capture parameter and image processing parameter stored in association with the values of data approximate to the values of data the characterizing the surface of the object designated in the received parameter inquiry request from the parameter storage unit 222, and transmits a response including the acquired values of image capture parameter and image processing parameter to the condition control unit 253 through the communication unit 221, the network control unit 253, and the communication unit 251. The condition control unit 253 sets an image capture condition determined by the value of the image capture parameter included in the received response in the image capture unit 254, and also sets an image processing condition determined by the value of the image processing parameter included in the received response in the feature value extraction unit 256. Next, the image capture unit 254 captures an image of an irregular pattern of the surface of an object to be subject to individual identification and individual matching under the set image capture condition, and stores the image into the image storage unit 255. Next, the feature value extraction unit 256 retrieves the image of the irregular pattern on the surface of the object to be subject to individual identification and individual matching stored in the image storage unit 255, and extracts a feature value from the image based on the set image processing condition. The process so far is basically the same as in the individual registration operation.

Next, the feature value extraction unit 256 outputs the extracted feature value to the score calculation unit 257. The feature value output from the feature value extraction unit 256 to the score calculation unit 257 at the time will be referred to as an individual identification and matching target feature value hereinafter. Next, the score calculation unit 257 retrieves all the feature values and supplementary information from the feature value storage unit 242 of the feature value storage device 240 through the communication unit 251, the network 260, and the communication unit 241. Next, the score calculation unit 257 calculates the correlation between the individual identification and matching target feature value input from the feature value extraction unit 256 and all the feature values retrieved from the feature value storage unit 242 of the feature value storage device 240, and calculates matching scores with respect to all the feature values. Next, the judgment unit 258 judges what feature value stored in the feature value storage unit 242 the individual identification and matching targe feature value agrees, based on the calculated matching scores. For example, the judgment unit 258 sorts the matching scores between the individual identification and matching target feature value and all the registered feature values, and selects a feature value for which the matching score is the maximum (correlation is the maximum). Then, the judgment unit 258 outputs supplementary information linked to the selected feature value as product information of the product to be identified and matched. Moreover, the judgment unit 258 may perform judgment whether the matching scores between the individual identification and matching target feature value and all the feature values stored in the feature value storage unit 242 exceed a preset threshold value or not. Then, in a case where any of the matching scores between the individual identification and matching target feature value and all the feature values stored in the feature value storage unit 242 does not exceed the threshold value, the judgment unit 258 judges that the product to be identified and matched is not registered, and outputs information representing an authentication error. The judgment unit 258 thus operating can be used for the purpose of individual authentication such as authenticity judgment of an object to be managed.

Next, the information presentation unit 259 receives the product information and authentication error information from the judgment unit 258, and displays the product information that is the result of individual identification of the product to be identified and matched and individual authentication information on a display device (not shown) or outputs to an external terminal.

According to this example embodiment, the same effect as in the first example embodiment can be obtained, and an effect as shown below can also be obtained.

Even when not including a function to specify an image capture condition and an image registration condition in advance, the individual registration device 230 and the individual matching device 250 can set an image capture condition and an image processing condition in the case of individual registration and individual matching of an object having a very similar surface to that of an object for which an image capture condition and an image processing operation are specified in advance in the individual identification device 210. The reason is that the individual registration device 230 and the individual matching device 250 can issue a parameter inquiry request with the designated value of data characterizing an object surface to the parameter storage device 220 in which the values of image capture parameter and image processing parameter determined in advance by the individual identification device 210, and thereby acquire a response including the values of the corresponding image capture parameter and image processing parameter.

THIRD EXAMPLE EMBODIMENT

This example embodiment is different from the first example embodiment in type and number of data characterizing an object surface. In this example embodiment, data characterizing an object surface includes material information composed of a material name and a reflectance, surface roughness information composed of a processing name and a surface mean roughness, and shape information composed of a shape name and inner and outer diameter dimensions.

FIG. 28 is a view showing an example of the content of a parameter storage unit 314 of an individual identification device according to this example embodiment. The parameter storage unit 314 corresponds to the parameter storage unit 114 of FIG. 4. Referring to FIG. 28, in the parameter storage unit 314, the values of an image capture parameter and an image processing parameter are stored in association with the value of data characterizing an object surface for each sample object group. Data relating to one group includes a group number, data characterizing an object surface, and a parameter. The data characterizing an object surface includes material information, surface roughness information, and shape information. The material information includes a material name and a reflectance, the surface roughness information includes a processing name, and surface mean roughness, and the shape information includes a shape name and the dimensions of an inner diameter and an outer diameter. The parameter is broadly divided into an image capture parameter and an image processing parameter. The image capture parameter is composed of two parameters of an illumination angle and an image resolution. The image processing parameter is composed of two parameters of a preprocessing parameter set and a feature extraction parameter set.

The material name is the same as the material in the first example embodiment, and is a category name such as metal and resin. The reflectance is a numerical value such as 70% and 30%. The processing name is a category name representing a processing method such as mat finish processing, lathe processing, and sandblasting. The surface mean roughness is the same as the surface roughness in the first example embodiment, and is numerical data such as 2 μm and 0.3 μm. The shape name is the same as the shape in the first example embodiment, and is a category name such as rectangle, circle, and ring. The dimensions of inner diameter and outer diameter are numerical data such as 0 mm and 15 mm. For example, the outer diameter of a rectangle is the length from the center of gravity to the end point of the rectangle. The outer diameter of a circle is the radius of the circle. The outer diameter of a ring is the length from the center of the ring to the outer periphery of the ring. The inner diameter of a ring is the length from the center of the ring to the inner periphery of the ring.

Further, a "standard value" written in a field of the material name is an item selected when the material information of a matched side is unknown or does not match the material information stored in the parameter storage unit 314. A "standard value" written in a field of the processing name is an item selected when the surface roughness information of a matched side is unknown or does not match the surface roughness information stored in the parameter storage unit 314. A "standard value" written in a field of the shape name is an item selected when the shape information of a matched side is unknown or does not match the shape information stored in the parameter storage unit 314.

In the parameter storage unit 314, optimum parameters (image resolution, illumination angle, preprocessing parameter set, feature extraction parameter set) are associated with all the combinations of the material information, the surface roughness information, and the shape information, respectively.

Next, an operation of acquiring a parameter corresponding to the value of data which is approximate to data characterizing the surface of an object to be identified and matched from the parameter storage unit 314 will be described. This operation is executed by a condition control unit of this example embodiment that corresponds to the condition control unit 102 of FIG. 4.

First, the condition control unit inputs data characterizing the surface of an object to be identified and matched. The data characterizing the surface of the object to be identified and matched includes matched-side material information, matched-side surface roughness information, and matched-side shape information. The matched-side material information includes a material name and a reflectance. The matched-side surface roughness information includes a processing method and surface mean roughness. The matched-side shape information includes a shape name and the dimensions of inner diameter and outer diameter. Of the material name, reflectance, processing method, surface mean roughness, shape name and dimensions of inner diameter and outer diameter of a matched side, an unknown item is not input.

Next, the condition control unit initializes by emptying a set where group numbers of the result of search are stored. Next, the condition control unit processes the matched-side material information. First, the condition control unit searches the parameter storage unit 314 for a group number having a material name which matches the material name of the matched-side material information. In a case where one or more group numbers are searched, the condition control unit stores the searched group numbers into the set, and ends processing of the matched-side material information. In a case where no group number having a material name which matches the material name of the matched-side material information is searched or the material name of the matched-side material information is omitted, the condition control unit searches the parameter storage unit 314 for a group number having a reflectance which matches the reflectance of the matched-side material information within a predetermined threshold value range. In a case where one or more group numbers are searched, the condition control unit stores the searched group numbers into the set, and ends processing of the matched-side material information. In a case where no group number having a reflectance which matches the reflectance of the matched-side material information within the predetermined threshold value range is searched or the reflectance of the matched-side material information is omitted, the condition control unit searches the parameter storage unit 314 for a group number whose material name is standard value, stores the searched group number into the set, and ends processing of the matched-side material information.

Upon ending the processing of the matched-side material information, the condition control unit processes the matched-side surface roughness information. First, the condition control unit searches the parameter storage unit 314 for a group number which matches any of the group numbers stored in the set and has surface mean roughness matching the surface mean roughness of the matched-side surface roughness information within a predetermined threshold value range. In a case where one or more group numbers are searched, the condition control unit overwrites the group numbers stored in the set with the searched group numbers, and ends processing of the matched-side surface roughness information. In a case where no corresponding group number is searched in the search or the surface mean roughness of the matched-side surface roughness information is omitted, the condition control unit searches the parameter storage unit 314 for a group number which matches any of the group numbers stored in the set and has a processing method matching the processing method of the matched-side surface roughness information. In a case where one or more group numbers are searched, the condition control unit overwrites the group numbers stored in the set with the searched group numbers, and ends processing of the matched-side surface roughness information. In a case where no corresponding group number is searched or the processing method of the matched-side surface roughness information is omitted, the condition control unit searches the parameter storage unit 314 for a group number which matches any of the group numbers stored in the set and whose processing method is standard value, overwrites the group number stored in the set with the searched group number, and ends processing of the matched-side surface roughness information.

Upon ending the processing of the matched-side surface roughness information, the condition control unit performs processing of the matched-side shape information. First, the condition control unit searches the parameter storage unit 314 for a group number which matches any of the group numbers stored in the set and has dimensions of inner diameter and outer diameter matching the dimensions of inner diameter and outer diameter of the matched-side shape information within a predetermined threshold value range. In a case where one or more group numbers are searched, the condition control unit overwrites the group numbers stored in the set with the searched group numbers, and ends processing of the matched-side shape information. In a case where no corresponding group number is searched in the search or the dimensions of inner diameter and outer diameter of the matched-side shape information are omitted, the condition control unit searches the parameter storage unit 314 for a group number which matches any of the group numbers stored in the set and has a shape name matching the shape name of the matched-side shape information. In a case where one or more group numbers are searched, the condition control unit overwrites the group numbers stored in the set with the searched group numbers, and ends processing of the matched-side shape information. In a case where no corresponding group number is searched or the shape name of the matched-side shape information is omitted, the condition control unit searches the parameter storage unit 314 for a group number which matches any of the group numbers stored in the set and whose shape name is standard value, overwrites the group number stored in the set with the searched group number, and ends processing of the matched-side shape information.

Upon ending the processing of the matched-side shape information, the condition control unit extracts one group number from the set, and extracts the parameters, that is, the illumination angle, image resolution, preprocessing parameter set and feature extraction parameter set stored in the parameter storage unit 314 in association with the extracted group number. The same operation as in the first example embodiment including image capture condition setting and image processing condition setting with the extracted parameters is performed.

FOUR EXAMPLE EMBODIMENT

Figure 29:
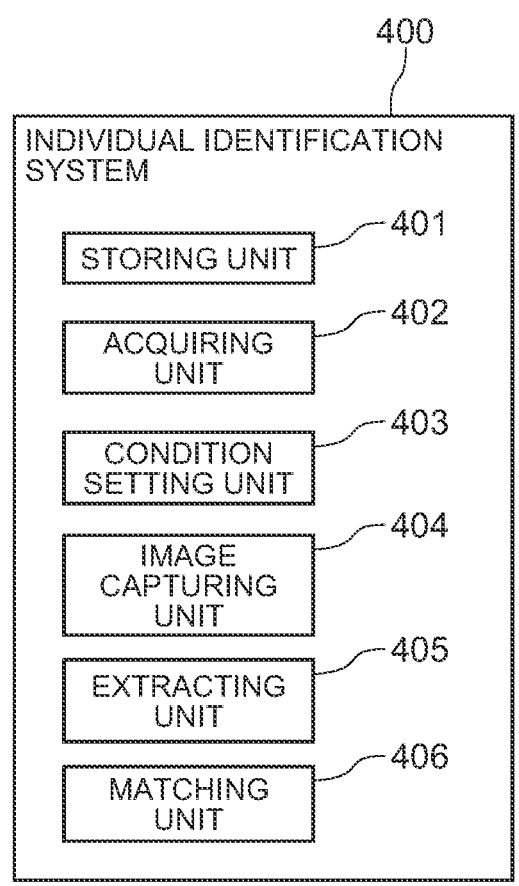
FIG. 29 is a block diagram of an individual identification system according to a fourth example embodiment of the present invention.

Referring to FIG. 29, an individual identification system 400 according to a fourth example embodiment of the present invention includes a storing unit 401, an acquiring unit 402, a condition setting unit 403, an image capturing unit 404, an extracting unit 405, and a matching unit 406.

The storing unit 401 is configured so that an image capture parameter is stored in association with data characterizing the surface of a reference object. The configuration of the storing unit 401 can be the same as, for example, that of the parameter storage unit 114 of FIG. 4, but is not limited thereto.

The acquiring unit 402 is configured to, when data characterizing the surface of an object to be matched is input, calculate the approximation degree between the input data and each data stored in the storing unit 401 and, based on the calculated approximation degree, acquire an image capture parameter applied to the object to be matched from the storing unit 401. The condition setting unit 403 is configured to set an image capture condition determined by the image capture parameter acquired by the acquiring unit 402. The configurations of the acquiring unit 402 and the condition setting unit 403 can be the same as, for example, that of the condition control unit 102 of FIG. 4, but is not limited thereto.

The image capturing unit 404 is configured to acquire an image of the surface of the object to be matched under the image capture condition set by the condition setting unit 403. The configuration of the image capturing unit 404 can be the same as, for example, that of the image capture unit 101 of FIG. 4, but is not limited thereto.

The extracting unit 405 is configured to extract a feature value from the image acquired by the image capturing unit 404. The condition of the extracting unit 405 can be the same as, for example, that of the feature value extraction unit 104 of FIG. 4, but is not limited thereto.

The matching unit 406 is configured to match the feature value extracted by the extracting unit 405 against a registered feature value. The configuration of the matching unit 406 can be the same as, for example, the configurations of the score calculation unit 109 and the judgment unit 115 of FIG. 4, but is not limited thereto.

The individual identification system 400 according to this example embodiment thus configured operates in the following manner. First, in the storing unit 401, an image capture parameter is stored in advance in association with data characterizing the surface of a reference object. Next, when data characterizing the surface of an object to be matched is input, the acquiring unit 402 calculates the approximation degree between the input data and each data stored in the storing unit 401 and, based on the calculated approximation degree, acquires an image capture parameter applied to the object to be matched from the storing unit 401. Next, the condition setting unit 403 sets an image capture condition determined by the image capture parameter acquired by the acquiring unit 402. Next the image capturing unit 404 acquires an image of the surface of the object to be matched under the image capture condition set by the condition setting unit 403. Next, the extracting unit 405 extracts a feature value from the image acquired by the image capturing unit 404. Next, the matching unit 406 matches the feature value extracted by the extracting unit 405 against a registered feature value.

Thus, in the individual identification system 400 according to this example embodiment, with respect to an object for which the value of an image capture parameter is not specified in advance and which has a very similar surface to the surface of an object for which the value of an image capture parameter is specified in advance, it is possible to set an image capture condition. The reason is that: an image capture parameter is stored in advance in association with data characterizing the surface of a reference object in the storing unit 401; when data characterizing the surface of an object to be matched is input, the acquiring unit 402 calculates the approximation degree between the input data and each data stored in the storing unit 401 and, based on the calculated approximation degree, acquires an image capture parameter applied to the object to be matched from the storing unit 401; and the condition setting unit 403 sets an image capture condition determined by the image capture parameter acquired by the acquiring unit 402.

FIFTH EXAMPLE EMBODIMENT

Figure 30:
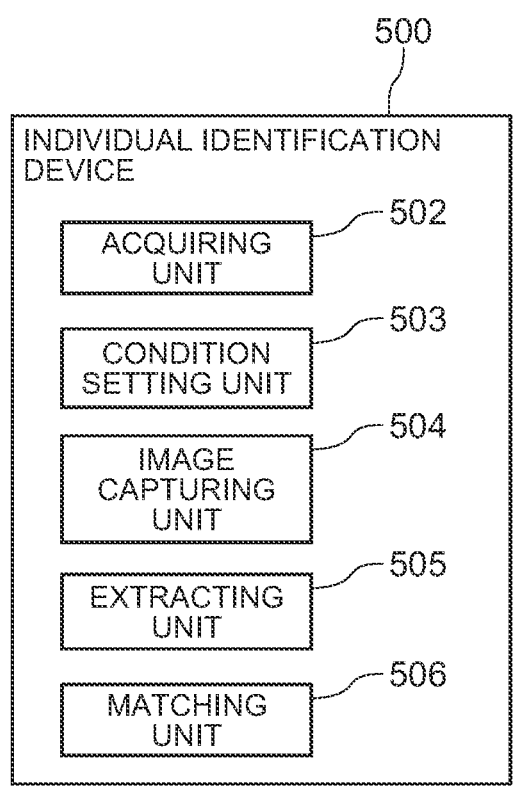
FIG. 30 is a block diagram of an individual identification device according to a fifth example embodiment of the present invention.

Referring to FIG. 30, an individual identification device 500 according to a fifth example embodiment of the present invention includes an acquiring unit 502, a condition setting unit 503, an image capturing unit 504, an extracting unit 505, and a matching unit 506.

The acquiring unit 502 is configured to, when data characterizing the surface of an object to be matched is input, calculate the approximation degree between each data stored in a storing unit for storing an image capture parameter in association with data characterizing the surface of a reference object and the input data, and acquire an image capture parameter applied to the object to be matched from the storing unit based on the calculated approximation degree. The condition setting unit 503 is configured to set an image capture condition determined by the image capture parameter acquired by the acquiring unit 502. The configurations of the acquiring unit 502 and the condition setting unit 503 can be the same as, for example, the condition of the condition control unit 102 of FIG. 4, but are not limited thereto.

The image capturing unit 504 is configured to acquire an image of the surface of the object to be matched under the image capture condition set by the condition setting unit 503. The configuration of the image capturing unit 504 can be the same as, for example, that of the image capture unit 101 of FIG. 4, but is not limited thereto.

The extracting unit 505 is configured to extract a feature value from the image acquired by the image capturing unit 504. The configuration of the extracting unit 505 can be the same as, for example, that of the feature value extraction unit 104 of FIG. 4, but is not limited thereto.

The matching unit 506 is configured to match the feature value extracted by the extracting unit 506 against a registered feature value. The configuration of the matching unit 506 can be the same as, for example, the configurations of the score calculation unit 109 and the judgment unit 115 of FIG. 4, but is not limited thereto.

The individual identification device 500 according to this example embodiment thus configured operates in the following manner. First, when data characterizing the surface of an object to be matched is input, the acquiring unit 502 calculates the approximation degree between each data stored in a storing unit for storing an image capture parameter in advance in association with data characterizing the surface of a reference object and the input data, and acquires an image capture parameter applied to the object to be matched from the storing unit based on the calculated approximation degree. Next, the condition setting unit 503 sets an image capture condition determined by the image capture parameter acquired by the acquiring unit 502. Next, the image capturing unit 504 acquires an image of the surface of the object to be matched under the image capture condition set by the condition setting unit 403. Next, the extracting unit 505 extracts a feature value from the image acquired by the image capturing unit 504. Next, the matching unit 506 matches the feature value extracted by the extracting unit 505 against a registered feature value.

Thus, in the individual identification device 500 according to this example embodiment, with respect to an object for which the value of an image capture parameter is not specified in advance and which has a very similar surface to the surface of an object for which the value of an image capture parameter is specified in advance, it is possible to set an image capture condition. The reason is that: when data characterizing the surface of an object to be matched is input, the acquiring unit 502 calculates the approximation degree between each data stored in a storing unit for storing an image capture parameter in advance in association with data characterizing the surface of a reference object and the input data, and acquires an image capture parameter applied to the object to be matched from the storing unit based on the calculated approximation degree; and the condition setting unit 503 sets an image capture condition determined by the image capture parameter acquired by the acquiring unit 502.

SIXTH EXAMPLE EMBODIMENT

Figure 31:
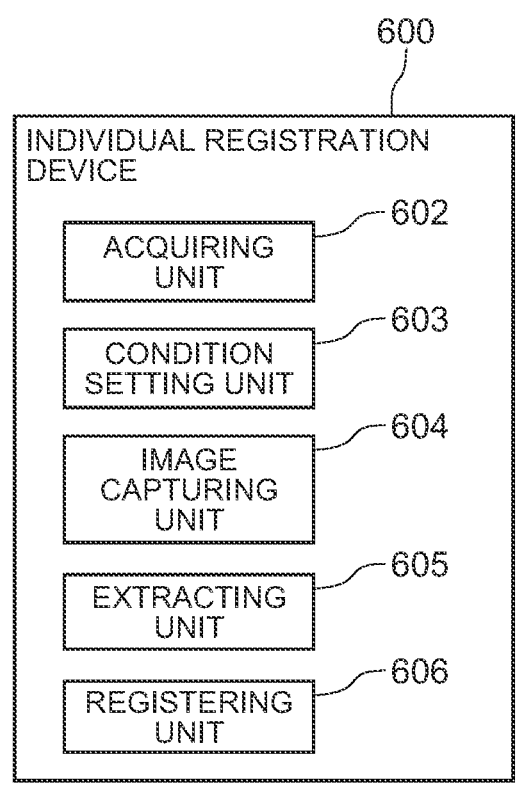
FIG. 31 is a block diagram of an individual registration device according to a sixth example embodiment of the present invention.

Referring to FIG. 31, an individual registration device 600 according to a sixth example embodiment of the present invention includes an acquiring unit 602, a condition setting unit 603, an image capturing unit 604, an extracting unit 605, and a registering unit 606.

The acquiring unit 602 is configured to, when data characterizing the surface of an object to be registered is input, calculate the approximation degree between each data stored in a storing unit for storing an image capture parameter in association with data characterizing the surface of a reference object and the input data, and acquire an image capture parameter applied to the object to be registered from the storing unit based on the calculated approximation degree. The condition setting unit 603 is configured to set an image capture condition determined by the image capture parameter acquired by the acquiring unit 602. The configurations of the acquiring unit 602 and the condition setting unit 603 can be the same as, for example, the configuration of the condition control unit 102 of FIG. 4, but are not limited thereto.

The image capturing unit 604 is configured to acquire an image of the surface of the object to be registered under the image capture condition set by the condition setting unit 603. The configuration of the image capturing unit 604 can be the same as, for example, that of the image capture unit 101 of FIG. 4, but is not limited thereto.

The extracting unit 605 is configured to extract a feature value from the image acquired by the image acquiring unit 604. The registering unit 606 is configured to register the feature value extracted by the extracting unit 605 as a registered feature value. The configurations of the extracting unit 605 and the registering unit 606 can be the same as, for example, the configuration of the feature value extraction unit 104 of FIG. 4, but are not limited thereto.

The individual registration device 600 according to this example embodiment thus configured operates in the following manner. First, when data characterizing the surface of an object to be registered is input, the acquiring unit 602 calculates the approximation degree between each data stored in a storing unit for storing an image capture parameter in advance in association with data characterizing the surface of a reference object and the input data, and acquires an image capture parameter applied to the object to be registered from the storing unit based on the calculated approximation degree. Next, the condition setting unit 603 sets an image capture condition determined by the image capture parameter acquired by the acquiring unit 602. Next, the image capturing unit 604 acquires an image of the surface of the object to be registered under the image capture condition set by the condition setting unit 603. Next, the extracting unit 605 extracts a feature value from the image acquired by the image capturing unit 604. Next, the registering unit 606 registers the feature value extracted by the extracting unit 605 as a registered feature value.

Thus, in the individual registration device 600 according to this example embodiment, with respect to an object for which the value of an image capture parameter is not specified in advance and which has a very similar surface to the surface of an object for which the value of an image capture parameter is specified in advance, it is possible to set an image capture condition. The reason is that: when data characterizing the surface of an object to be registered is input, the acquiring unit 602 calculates the approximation degree between each data stored in a storing unit for storing an image capture parameter in advance in association with data characterizing the surface of a reference object and the input data, and acquires an image capture parameter applied to the object to be registered from the storing unit based on the calculated approximation degree; and the condition setting unit 603 sets an image capture condition determined by the image capture parameter acquired by the acquiring unit 602.

Although the present invention has been described above with reference to the example embodiments, the present invention is not limited to the above example embodiments. The configurations and details of the present invention can be changed in various manners that can be understood by one skilled in the art within the scope of the present invention.

The present invention can be utilized in the field of acquiring differences in spontaneous fine patterns caused in the same production processes, such as fine irregularities and patterns on product surfaces and random patterns on material surfaces, as images using an image capturing device such as a camera, and recognizing the fine patterns, thereby performing individual identification and management of each product. For example, it can be used for traceability on a production line in a factory or the like, or for managing traceability by the zipper of a designer product, or the like.

The whole or part of the example embodiments disclosed above can be described as, but not limited to, the following supplementary notes.

[Supplementary Note 1]

An individual identification system comprising:

a storing unit configured to have an image capture parameter stored therein in association with data characterizing a surface of a reference object;

an acquiring unit configured to, when data characterizing a surface of an object to be matched is input, calculate an approximation degree between the input data and each data stored in the storing unit, and acquire the image capture parameter applied to the object to be matched from the storing unit based on the calculated approximation degree;

a condition setting unit configured to set an image capture condition determined by the acquired image capture parameter;

an image capturing unit configured to acquire an image of the surface of the object to be matched under the set image capture condition;

an extracting unit configured to extract a feature value from the acquired image; and a matching unit configured to match the extracted feature value against a registered feature value.

[Supplementary Note 2]

The individual identification system according to Supplementary Note 1, wherein:

the storing unit is configured to further have an image processing parameter stored therein in association with the data characterizing the surface of the reference object;

the acquiring unit is further configured to acquire the image processing parameter applied to the object to be matched from the storing unit based on the calculated approximation degree;

the condition setting unit is further configured to set an image processing condition determined by the acquired image processing parameter; and the extracting unit is configured to, under the set image processing condition, perform image processing on the image and extract a feature value from the image.

[Supplementary Note 3]

The individual identification system according to Supplementary Note 2, wherein:

the extracting unit is configured to, in the image processing, perform preprocessing on the image and a feature extraction process on the image after the preprocessing; and the image processing parameter includes at least one parameter of one or more parameters used in the preprocessing and one or more parameters used in the feature extraction process.

[Supplementary Note 4]

The individual identification system according to any of Supplementary Notes 1 to 3, wherein the image capture parameter includes at least one parameter of a parameter representing an illumination angle that is an angle at which an illumination light enters the surface of the object to be matched and a parameter representing image resolution of the image.

[Supplementary Note 5]

The individual identification system according to any of Supplementary Notes 1 to 4, wherein the data characterizing the surface includes at least one of data representing a type of a material of the surface, data representing a degree of roughness of the surface, and data representing a shape of the surface.

[Supplementary Note 6]

The individual identification system according to any of Supplementary Notes 1 to 5, comprising:

a feature value pair generating unit configured to: have a feature value input therein, the feature value being extracted from each of a plurality of images obtained by capturing images of respective surfaces of a plurality of types of reference objects a plurality of times with a value of the image capture parameter as a certain candidate value; generate a feature value pair as a first feature value pair for each of the plurality of types of reference objects, the first feature value pair being a pair in which two feature values forming the pair are extracted from a plurality of images of identical type of reference objects; and generate a feature value pair as a second feature value pair for each of all combinations of the plurality of types of reference objects, the second feature value pair being a pair in which two feature values forming the pair are extracted from a plurality of images of mutually different types of reference objects; and a parameter determining unit configured to generate a first distribution that is a distribution of matching scores of the plurality of first feature value pairs, generate a second distribution that is a distribution of matching scores of the second feature value pairs, and determine whether or not to adopt the candidate value based on a separation degree between the first distribution and the second distribution.

[Supplementary Note 7]

An individual identification device comprising:

an acquiring unit configured to, when data characterizing a surface of an object to be matched is input, calculate an approximation degree between each data stored in a storing unit configured to have an image capture parameter stored therein in association with data characterizing a surface of a reference object and the input data, and acquire the image capture parameter applied to the object to be matched from the storing unit based on the calculated approximation degree;

a condition setting unit configured to set an image capture condition determined by the acquired image capture parameter;

an image capturing unit configured to acquire an image of the surface of the object to be matched under the set image capture condition;

an extracting unit configured to extract a feature value from the acquired image; and a matching unit configured to match the extracted feature value against a registered feature value.

[Supplementary Note 8]

An individual registration device comprising:

an acquiring unit configured to, when data characterizing a surface of an object to be registered is input, calculate an approximation degree between each data stored in a storing unit configured to have an image capture parameter stored therein in association with data characterizing a surface of a reference object and the input data, and acquire the image capture parameter applied to the object to be registered from the storing unit based on the calculated approximation degree;

a condition setting unit configured to set an image capture condition determined by the acquired image capture parameter;

an image capturing unit configured to acquire an image of the surface of the object to be registered under the set image capture condition;

an extracting unit configured to extract a feature value from the acquired image; and a registering unit configured to register the extracted feature value as a registered feature value.

[Supplementary Note 9]

A non-transitory computer-readable recording medium having a program recorded therein, the program comprising instructions to cause a computer to function as:

an acquiring unit configured to, when data characterizing a surface of an object to be matched is input, calculate an approximation degree between each data stored in a storing unit configured to have an image capture parameter stored therein in association with data characterizing a surface of a reference object and the input data, and acquire the image capture parameter applied to the object to be matched from the storing unit based on the calculated approximation degree;

a condition setting unit configured to set an image capture condition determined by the acquired image capture parameter;

an image capturing unit configured to acquire an image of the surface of the object to be matched under the set image capture condition;

an extracting unit configured to extract a feature value from the acquired image; and a matching unit configured to match the extracted feature value against a registered feature value.

[Supplementary Note 10]

An individual identification method comprising:

when data characterizing a surface of an object to be matched is input, calculating an approximation degree between each data stored in a storing unit configured to have an image capture parameter stored therein in association with data characterizing a surface of a reference object and the input data, and acquiring the image capture parameter applied to the object to be matched from the storing unit based on the calculated approximation degree;

setting an image capture condition determined by the acquired image capture parameter;

acquiring an image of the surface of the object to be matched under the set image capture condition;

extracting a feature value from the acquired image; and matching the extracted feature value against a registered feature value.

[Supplementary Note 11]

The individual identification method according to Supplementary Note 10, wherein:

the storing unit is configured to further have an image processing parameter stored therein in association with the data characterizing the surface of the reference object;

in the acquisition, the image processing parameter applied to the object to be matched is further acquired from the storing unit based on the calculated approximation degree;

in the setting, an image processing condition determined by the acquired image processing parameter is further set; and in the extraction, under the set image processing condition, image processing is performed on the image and a feature value is extracted from the image.

[Supplementary Note 12]

The individual identification method according to Supplementary Note 11, wherein:

in the image processing, preprocessing on the image and a feature extraction process on the image after the preprocessing are performed; and the image processing parameter includes at least one parameter of one or more parameters used in the preprocessing and one or more parameters used in the feature extraction process.

[Supplementary Note 13]

The individual identification method according to any of Supplementary Notes 10 to 12, wherein the image capture parameter includes at least one parameter of a parameter representing an illumination angle that is an angle at which an illumination light enters the surface of the object to be matched and a parameter representing image resolution of the image.

[Supplementary Note 14]

The individual identification method according to any of Supplementary Notes 10 to 13, wherein the data characterizing the surface includes at least one of data representing a type of a material of the surface, data representing a degree of roughness of the surface, and data representing a shape of the surface.

[Supplementary Note 15]

The individual identification method according to any of Supplementary Notes 10 to 14, further comprising:

inputting a feature value extracted from each of a plurality of images obtained by capturing images of respective surfaces of a plurality of types of reference objects a plurality of times with a value of the image capture parameter as a certain candidate value; generating a feature value pair as a first feature value pair for each of the plurality of types of reference objects, the first feature value pair being a pair in which two feature values forming the pair are extracted from a plurality of images of identical type of reference objects; and generating a feature value pair as a second feature value pair for each of all combinations of the plurality of types of reference objects, the second feature value pair being a pair in which two feature values forming the pair are extracted from a plurality of images of mutually different types of reference objects; and generating a first distribution that is a distribution of matching scores of the plurality of first feature value pairs, generating a second distribution that is a distribution of matching scores of the second feature value pairs, and determining whether or not to adopt the candidate value based on a separation degree between the first distribution and the second distribution.

[Supplementary Note 16]

An individual registration method comprising:

when data characterizing a surface of an object to be registered is input, calculating an approximation degree between each data stored in a storing unit configured to have an image capture parameter stored therein in association with data characterizing a surface of a reference object and the input data, and acquiring the image capture parameter applied to the object to be registered from the storing unit based on the calculated approximation degree;

setting an image capture condition determined by the acquired image capture parameter;

acquiring an image of the surface of the object to be registered under the set image capture condition;

extracting a feature value from the acquired image; and registering the extracted feature value as a registered feature value.

DESCRIPTION OF NUMERALS 100 individual identification device
101 image capture unit
102 condition control unit
103 image storage unit
104 feature value extraction unit
105 feature value storage unit
106 feature value pair generation unit
107 first feature value pair storage unit
108 second feature value pair storage unit
109 score calculation unit
110 distribution generation unit
111 distribution storage unit
113 parameter determination unit
114 parameter storage unit
115 judgment unit
116 information presentation unit
117 object information input unit
150 information processing device
151 imaging unit
152 operation input unit
153 screen display unit
154 communication interface unit
155 storage unit
156 arithmetic logic unit
157 program
161 camera
162 zoom lens
163 illuminator
164 object to be identified
165 table
166 illuminator
200 individual identification system
210 individual identification device
211 communication unit
220 parameter storage device
221 communication unit
222 parameter storage unit
223 parameter presentation unit
230 individual registration device
231 communication unit
232 object information input unit
233 condition control unit
234 image capture unit
235 image storage unit
236 feature value extraction unit
240 feature value storage device
241 communication unit
242 feature value storage unit
250 individual matching device
251 communication unit
252 object information input unit
253 condition control unit
254 image capture unit
255 image storage unit
256 feature value extraction unit
257 score calculation unit
258 judgment unit
259 information presentation unit
400 individual identification system
401 storing unit
402 acquiring unit
403 condition setting unit
404 image capturing unit
405 extracting unit
406 matching unit
500 individual identification device
502 acquiring unit
503 condition setting unit
504 image capturing unit
505 extraction unit
506 matching unit
600 individual registration device
602 acquiring unit
603 condition setting unit
604 image capturing unit
605 extracting unit
606 registering unit

What is claimed is:

1. An individual identification system comprising:

a storing unit configured to have an image capture parameter stored therein in association with data characterizing a surface of a reference object;

an acquiring unit configured to, when data characterizing a surface of an object to be matched is input, calculate an approximation degree between the input data and each data stored in the storing unit, and acquire the image capture parameter applied to the object to be matched from the storing unit based on the calculated approximation degree;

a condition setting unit configured to set an image capture condition determined by the acquired image capture parameter;

an image capturing unit configured to acquire an image of the surface of the object to be matched under the set image capture condition;

an extracting unit configured to extract a feature value from the acquired image; and a matching unit configured to match the extracted feature value against a registered feature value.

2. The individual identification system according to claim 1, wherein:

the storing unit is configured to further have an image processing parameter stored therein in association with the data characterizing the surface of the reference object;

the acquiring unit is further configured to acquire the image processing parameter applied to the object to be matched from the storing unit based on the calculated approximation degree;

the condition setting unit is further configured to set an image processing condition determined by the acquired image processing parameter; and the extracting unit is configured to, under the set image processing condition, perform image processing on the image and extract a feature value from the image.

3. The individual identification system according to claim 2, wherein:

the extracting unit is configured to, in the image processing, perform preprocessing on the image and a feature extraction process on the image after the preprocessing; and the image processing parameter includes at least one parameter of one or more parameters used in the preprocessing and one or more parameters used in the feature extraction process.

4. The individual identification system according to claim 1, wherein the image capture parameter includes at least one parameter of a parameter representing an illumination angle that is an angle at which an illumination light enters the surface of the object to be matched and a parameter representing image resolution of the image.

5. The individual identification system according to claim 1, wherein the data characterizing the surface includes at least one of data representing a type of a material of the surface, data representing a degree of roughness of the surface, and data representing a shape of the surface.

6. The individual identification system according to claim 1, comprising:

a feature value pair generating unit configured to: have a feature value input therein, the feature value being extracted from each of a plurality of images obtained by capturing images of respective surfaces of a plurality of types of reference objects a plurality of times with a value of the image capture parameter as a certain candidate value; generate a feature value pair as a first feature value pair for each of the plurality of types of reference objects, the first feature value pair being a pair in which two feature values forming the pair are extracted from a plurality of images of identical type of reference objects; and generate a feature value pair as a second feature value pair for each of all combinations of the plurality of types of reference objects, the second feature value pair being a pair in which two feature values forming the pair are extracted from a plurality of images of mutually different types of reference objects; and a parameter determining unit configured to generate a first distribution that is a distribution of matching scores of the plurality of first feature value pairs, generate a second distribution that is a distribution of matching scores of the second feature value pairs, and determine whether or not to adopt the candidate value based on a separation degree between the first distribution and the second distribution.

7. A non-transitory computer-readable recording medium having a program recorded therein, the program comprising instructions to cause a computer to function as:

an acquiring unit configured to, when data characterizing a surface of an object to be matched is input, calculate an approximation degree between each data stored in a storing unit configured to have an image capture parameter stored therein in association with data characterizing a surface of a reference object and the input data, and acquire the image capture parameter applied to the object to be matched from the storing unit based on the calculated approximation degree;

a condition setting unit configured to set an image capture condition determined by the acquired image capture parameter;

an image capturing unit configured to acquire an image of the surface of the object to be matched under the set image capture condition;

an extracting unit configured to extract a feature value from the acquired image; and a matching unit configured to match the extracted feature value against a registered feature value.

8. An individual identification method comprising:

when data characterizing a surface of an object to be matched is input, calculating an approximation degree between each data stored in a storing unit configured to have an image capture parameter stored therein in association with data characterizing a surface of a reference object and the input data, and acquiring the image capture parameter applied to the object to be matched from the storing unit based on the calculated approximation degree;

setting an image capture condition determined by the acquired image capture parameter;

acquiring an image of the surface of the object to be matched under the set image capture condition;

extracting a feature value from the acquired image; and matching the extracted feature value against a registered feature value.

9. The individual identification method according to claim 8, wherein:

the storing unit is configured to further have an image processing parameter stored therein in association with the data characterizing the surface of the reference object;

in the acquisition, the image processing parameter applied to the object to be matched is further acquired from the storing unit based on the calculated approximation degree;

in the setting, an image processing condition determined by the acquired image processing parameter is further set; and in the extraction, under the set image processing condition, image processing is performed on the image and a feature value is extracted from the image.

10. The individual identification method according to claim 9, wherein:
in the image processing, preprocessing on the image and a feature extraction process on the image after the preprocessing are performed; and
the image processing parameter includes at least one parameter of one or more parameters used in the preprocessing and one or more parameters used in the feature extraction process.

11. The individual identification method according to claim 8, wherein the image capture parameter includes at least one parameter of a parameter representing an illumination angle that is an angle at which an illumination light enters the surface of the object to be matched and a parameter representing image resolution of the image.

12. The individual identification method according to claim 8, wherein the data characterizing the surface includes at least one of data representing a type of a material of the surface, data representing a degree of roughness of the surface, and data representing a shape of the surface.

13. The individual identification method according to claim 8, further comprising:
inputting a feature value extracted from each of a plurality of images obtained by capturing images of respective surfaces of a plurality of types of reference objects a plurality of times with a value of the image capture parameter as a certain candidate value; generating a feature value pair as a first feature value pair for each of the plurality of types of reference objects, the first feature value pair being a pair in which two feature values forming the pair are extracted from a plurality of images of identical type of reference objects; and generating a feature value pair as a second feature value pair for each of all combinations of the plurality of types of reference objects, the second feature value pair being a pair in which two feature values forming the pair are extracted from a plurality of images of mutually different types of reference objects; and
generating a first distribution that is a distribution of matching scores of the plurality of first feature value pairs, generating a second distribution that is a distribution of matching scores of the second feature value pairs, and determining whether or not to adopt the candidate value based on a separation degree between the first distribution and the second distribution.

* * * * *